US012205440B2

(12) United States Patent
Marks et al.

(10) Patent No.: US 12,205,440 B2
(45) **Date of Patent: *Jan. 21, 2025**

(54) MECHANISMS THAT ENABLE A USER-CONFIGURABLE SLOT TYPE CONCATENATION GAME

(71) Applicant: Aristocrat Technologies, Inc., Las Vegas, NV (US)

(72) Inventors: Daniel Marks, Decatur, GA (US); John Milliner, III, Alpharetta, GA (US); Hua Xu, Marietta, GA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,263

(22) Filed: May 15, 2023

(65) Prior Publication Data

US 2023/0282072 A1 Sep. 7, 2023

Related U.S. Application Data

(63) Continuation of application No. 17/683,766, filed on Mar. 1, 2022, now Pat. No. 11,688,246.

(Continued)

(51) Int. Cl.
*G07F 17/32* (2006.01)

(52) U.S. Cl.
CPC ...... *G07F 17/3267* (2013.01); *G07F 17/3213* (2013.01); *G07F 17/3227* (2013.01); *G07F 17/3258* (2013.01)

(58) Field of Classification Search
None
See application file for complete search history.

(56) References Cited

U.S. PATENT DOCUMENTS

D392,269 S 3/1998 Mason
6,585,591 B1 7/2003 Baerlocher (Continued)

FOREIGN PATENT DOCUMENTS

CN 304431992 12/2017

OTHER PUBLICATIONS

Aristocrat, Moon Drifter video, https://www.youtube.com/watch?v=EmyYyzX1rKs, Circa 2013-2014.

(Continued)

*Primary Examiner* — Jason T Yen
(74) *Attorney, Agent, or Firm* — Brownstein Hyatt Farber Schreck, LLP

(57) ABSTRACT

Rather than typical slot type games where specific matching combinations of symbols along paylines through a row-by-column grid or matrix indicate the outcome of the game, a slot type concatenation game concatenates value symbols along a payline to form a numerical outcome. Non-value symbols may be omitted and/or ignored. Further, the payline may be indicated by the presence of a trigger symbol, which may allow the payline to change between different plays of the slot type concatenation game. Further, the slot type concatenation game may be user-configurable. Users may be allowed to indicate the number of the symbol reels that may include value symbols that will be concatenated along a payline defined by the trigger symbol. Users may be allowed indicate the denomination set that is used to configure the symbol reels with value symbols, such as from one or more value symbol tables.

20 Claims, 15 Drawing Sheets

Related U.S. Application Data

(60) Provisional application No. 63/220,335, filed on Jul. 9, 2021.

(56) References Cited

U.S. PATENT DOCUMENTS

| | | | | |
|---|---|---|---|---|
| 6,589,114 | B2 | 7/2003 | Rose | |
| 6,604,740 | B1 | 8/2003 | Singer | |
| 6,634,945 | B2 | 10/2003 | Glavich | |
| 7,077,745 | B2 | 7/2006 | Gomez | |
| 7,192,347 | B1 * | 3/2007 | Marks | G07F 17/3209 463/19 |
| D675,646 | S | 2/2013 | Frost | |
| D706,290 | S | 6/2014 | Hartley | |
| D714,329 | S | 9/2014 | Wood | |
| D743,973 | S | 11/2015 | Ahn | |
| D757,743 | S | 5/2016 | Kang | |
| D764,538 | S | 8/2016 | Lee | |
| D768,658 | S | 10/2016 | Osotio | |
| D783,034 | S | 4/2017 | Solop | |
| D800,756 | S | 10/2017 | Kim | |
| 9,978,222 | B2 | 5/2018 | Walker | |
| D871,419 | S | 12/2019 | Hu | |
| D895,646 | S | 9/2020 | Sanborn | |
| D902,247 | S | 11/2020 | Sascha | |
| D910,041 | S | 2/2021 | Edstrom | |
| D913,321 | S | 3/2021 | Pi | |
| D913,326 | S | 3/2021 | Mariani | |
| 10,950,083 | B2 | 3/2021 | Medford | |
| D917,534 | S | 4/2021 | La Guardia | |
| D922,409 | S | 6/2021 | Visser et al. | |
| D923,050 | S | 6/2021 | Kataoka | |
| D925,598 | S | 7/2021 | Sanborn | |
| 11,107,313 | B1 | 8/2021 | Georgilas | |
| D930,671 | S | 9/2021 | Ho | |
| 11,195,377 | B2 | 12/2021 | Sanborn | |
| D942,466 | S | 2/2022 | Degens | |
| D943,628 | S | 2/2022 | Kataoka | |
| D948,561 | S | 4/2022 | O'Neal | |
| D954,733 | S | 6/2022 | Masci | |
| D961,616 | S | 8/2022 | Saunders | |
| D965,024 | S | 9/2022 | Christiaan | |
| 11,562,631 | B2 | 1/2023 | Warms | |
| D978,174 | S | 2/2023 | Marks | |
| D989,773 | S | 6/2023 | Heil | |
| D999,223 | S | 9/2023 | Visser | |
| D999,774 | S | 9/2023 | Sanborn | |
| 2005/0119043 | A1 | 6/2005 | Berman | |
| 2005/0266911 | A1 | 12/2005 | Kojima | |
| 2009/0117991 | A1 * | 5/2009 | Yoshizawa | G07F 17/34 463/21 |
| 2010/0016059 | A1 * | 1/2010 | Sims | G07F 17/32 463/20 |
| 2012/0115570 | A1 | 5/2012 | Collette | |
| 2014/0274341 | A1 | 9/2014 | Janosov | |
| 2015/0228153 | A1 | 8/2015 | Hedrick | |
| 2015/0248807 | A1 | 9/2015 | Berman | |
| 2016/0125693 | A1 | 5/2016 | Berman | |
| 2016/0171835 | A1 | 6/2016 | Washington | |
| 2016/0302717 | A1 | 10/2016 | Tawa | |
| 2017/0011582 | A1 | 1/2017 | Fong | |
| 2017/0024955 | A1 | 1/2017 | Pawloski | |
| 2017/0092048 | A1 * | 3/2017 | Fujisawa | G07F 17/3211 |
| 2017/0103613 | A1 | 4/2017 | Berman | |
| 2018/0061174 | A1 | 3/2018 | Boese | |
| 2018/0061176 | A1 | 3/2018 | Berman | |
| 2018/0089931 | A1 | 3/2018 | Hawkins | |
| 2018/0130285 | A1 * | 5/2018 | Ang | G07F 17/3244 |
| 2018/0268659 | A1 | 9/2018 | Chesworth | |
| 2018/0308312 | A1 | 10/2018 | Weiss | |
| 2019/0035220 | A1 | 1/2019 | Dewaal | |
| 2019/0051113 | A1 | 2/2019 | Marks | |
| 2019/0295361 | A1 | 9/2019 | Fong | |
| 2019/0304245 | A1 | 10/2019 | Fong | |
| 2019/0378369 | A1 | 12/2019 | Washington | |
| 2020/0058197 | A1 * | 2/2020 | Cong | G07F 17/3225 |
| 2020/0074787 | A1 | 3/2020 | Casey | |
| 2020/0111328 | A1 * | 4/2020 | Bland | G07F 17/34 |
| 2020/0250922 | A1 * | 8/2020 | Medford | G07F 17/3267 |
| 2020/0364985 | A1 * | 11/2020 | Meyer | G07F 17/3213 |
| 2021/0043038 | A1 | 2/2021 | Marks | |
| 2021/0192893 | A1 * | 6/2021 | Medford | G07F 17/3258 |
| 2021/0304565 | A1 | 9/2021 | Marks | |
| 2022/0068083 | A1 | 3/2022 | Miliziano | |
| 2022/0084357 | A1 | 3/2022 | Miliziano | |
| 2022/0180705 | A1 | 6/2022 | Zettergren | |
| 2022/0335789 | A1 | 10/2022 | Colvin | |
| 2023/0051858 | A1 | 2/2023 | Bodosci | |

OTHER PUBLICATIONS

Scientific Games, Ultimate Fire Link SG Gaming—Ultimate Fire Link By The Bay, 2017 G2E.

Office Action (Non-Final Rejection) dated Mar. 21, 2022 for U.S. Appl. No. 17/189,759 (pp. 1-16).

Office Action (Final Rejection) dated Aug. 24, 2022 for U.S. Appl. No. 17/189,759 (pp. 1-13).

Office Action (Non-Final Rejection) dated Feb. 7, 2023 for U.S. Appl. No. 17/189,759 (pp. 1-12).

Notice of Allowance dated Apr. 19, 2023 for U.S. Appl. No. 17/189,759 (pp. 1-8).

Notice of Allowance dated Oct. 27, 2023 for U.S. Appl. No. 29/798,792 (pp. 1-8).

Office Action (Notice of Allowance and Fees Due (PTOL-85)) dated Apr. 19, 2023 for U.S. Appl. No. 17/683,766 (pp. 1-9).

Office Action dated Aug. 9, 2023 for U.S. Appl. No. 29/798,792 (pp. 1-14).

Casino Online Slot Games, Fortune Panda !!! Mega Big Win 2016, Publication Date Mar. 16, 2016, Retrieved Date Jun. 28, 2023, Retrieved from Internet, < https://www.youtube.com/watch?v=QM9mwX-TSig>(Year: 2016).

Bitstarz, Take Home Seductive Wins in Poison Eve Slot!, Publication Date Jan. 10, 2020, Retrieved Date Jun. 28, 2023, Retrieved from Internet, < https://www.bitstarz.com/blog/take-home-seductive-wins-in-poison-eve-slot>(Year: 2020).

Sarah Blackburn, VR Will Revolutionize the Casino Business, Publication Date Mar. 16, 2023, Retrieved Date Jun. 28, 2023, Retrieved from Internet, < https://vrscout.com/news/vr-will-revolutionize-casino-business/>( (Year: 2023).

* cited by examiner

MECHANISMS THAT ENABLE A USER-CONFIGURABLE SLOT TYPE CONCATENATION GAME

CROSS-REFERENCE

The present application is a continuation of U.S. patent application Ser. No. 17/683,766, filed Mar. 1, 2022, which claims priority to U.S. Provisional Patent Application No. 63/220,335, filed Jul. 9, 2021, the contents of which are hereby incorporated by reference in their entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Some typical games, such as Class III slot type games, use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Other typical games, such as Class II slot type games, determine a result of a bingo game and then select and present a slot type game outcome that corresponds to the result of the bingo game (such as one or more "facades" or slot type game screens that have an outcome matching that of the result of the bingo game). Notably, some games may include an element of skill on the part of the player and are therefore not entirely random.

SUMMARY

In various embodiments, a system includes at least one user interface mechanism that receives an indication of a number of symbol reels, the symbol reels including non-value symbols, and an indication of a denomination set; at least one non-transitory storage medium storing instructions; and at least one processor. The at least one processor executes the instructions to configure the symbol reels using value symbols from a value symbol table according to the indication of the denomination set, determine an outcome of the number of the symbol reels, and determine a game outcome by concatenating a number of the value symbols present in the outcome of the number of the symbol reels along a payline indicated by a trigger symbol present on a trigger reel.

In some embodiments, a system includes symbol reels operable to iterate through a sequence of possible symbol reel outcomes and stop at a final symbol reel outcome, the symbol reels including nonvalue symbols; a trigger reel operable to iterate through a sequence of possible trigger reel outcomes and stop at a final trigger reel outcome; at least one user interface mechanism that receives an indication of a number of the symbol reels and an indication of a denomination set; and at least one processor. The at least one processor configures the symbol reels with value symbols according to the indication of the denomination set, determine an outcome of the number of the symbol reels, and determine a game outcome by concatenating a number of the value symbols present in the outcome of the number of the symbol reels along a payline indicated by a trigger symbol present on a trigger reel.

In a number of embodiments, a system includes at least one non-transitory storage medium storing instructions and at least one processor. The at least one processor executes the instructions to receive an indication of a number of symbol reels, the symbol reels including nonvalue symbols; receive an indication of a denomination set; when the indication of the denomination set indicates a first denomination set, configure the symbol reels with first value symbols that include a first respin value; when the indication of the denomination set indicates a second denomination set, configure the symbol reels with second value symbols that include a second respin value; determine a first outcome of the number of the symbol reels; determine a first game outcome by concatenating a first number of the first value symbols or the second value symbols present in the first outcome of the number of the symbol reels along a first payline indicated by a first trigger symbol present on a trigger reel; determine to respin at least when the first game outcome includes the first respin value or the second respin value; and upon determining to respin, determine a second outcome of the number of the symbol reels and determine a second game outcome by concatenating a second number of the first value symbols or the second value symbols present in the second outcome of the number of the symbol reels along a second payline indicated by a second trigger symbol present on the trigger reel.

DETAILED DESCRIPTION

Figure 1:
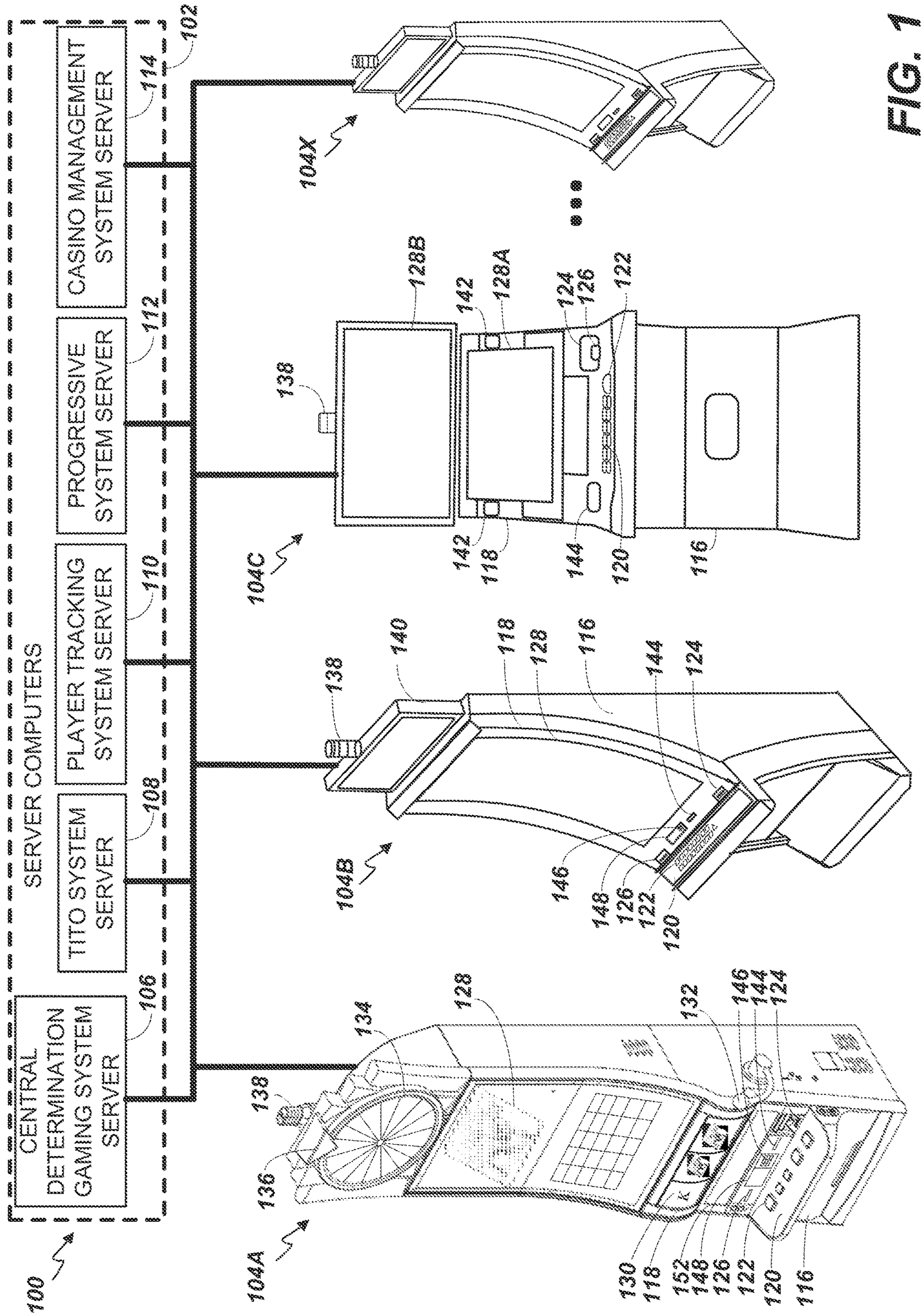
FIG. 1 is an exemplary diagram showing several EGMs networked with various gaming related servers.

The present disclosure relates to systems, methods, and apparatuses for providing and/or operating user-configurable slot type concatenation games. Rather than typical slot type games where specific matching combinations of symbols along paylines through a row-by-column grid or matrix indicate the outcome of the game, the slot type concatenation game of the present disclosure may concatenate value symbols (such as numerals) along a payline to form a numerical outcome. Non-value symbols (such as non-numerals) may be omitted and/or ignored. Further, the payline may be indicated by the presence of a trigger symbol, which may allow the payline to change between different plays of the slot type concatenation game. Further, the slot type concatenation game is user-configurable. The user-configurable slot type concatenation game of the present disclosure allows users to indicate the number of the symbol reels that may include value symbols that will be concatenated along a payline defined by the trigger symbol. The user-configurable slot type concatenation game of the present disclosure allows users to indicate the denomination set that is used to configure the symbol reels with value symbols, such as from one or more value symbol tables. Such user-configurability greatly extends the number of possible outcomes of play of the user-configurable slot type concatenation game.

In various implementations, user-configurable slot type concatenation games may include one or more trigger reels and a number of symbol reels. One or more user interface mechanisms may receive an indication of a number of the symbol reels and an indication of a denomination set. One or more of the symbol reels may be configured with value symbols and/or nonvalue symbols according to the indication of the denomination set, such as by obtaining the value symbols and/or the nonvalue symbols from one or more tables. Upon determining that a trigger symbol is present in determined outcomes of the trigger reels, a game outcome may be determined from determined outcomes of the symbols reels by concatenating the value symbols on the indicated number of the symbol reels along a payline indicated by the trigger symbol.

In this way, the technique for providing the user-configurable slot type concatenation game discussed herein may provide unconventional technical solutions for implementing slot type concatenation games with different numbers of reels and/or different sets of value symbols, without requiring multiple game machines and/or storage of multiple games by game machines and/or storage that supports game machines. These techniques may greatly expand the game capabilities of the slot type concatenation game and/or the functions related to the slot type concatenation game, and may also improve the operation of the devices and/or systems that implement the slot type concatenation game by reducing duplicate hardware (such as may be the case with implementations that require multiple game machines) and/or software (such as may be the case with implementations that require storage of multiple games by game machines), eliminating more resource-consumptive solutions to the above issues, and so on. Such capabilities may greatly extend the useful life of the slot type concatenation game and/or greatly delay the time when the game machine involved in the slot type concatenation game may be replaced.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a “ticket-in” reader that allows the player to use a casino issued credit ticket to load credits onto the gaming device 104A (e.g., in a cashless ticket (“TITO”) system). In such cashless implementations, the gaming device 104A may also include a “ticket-out” printer 126 for outputting a credit ticket when a “cash out” button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player’s smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
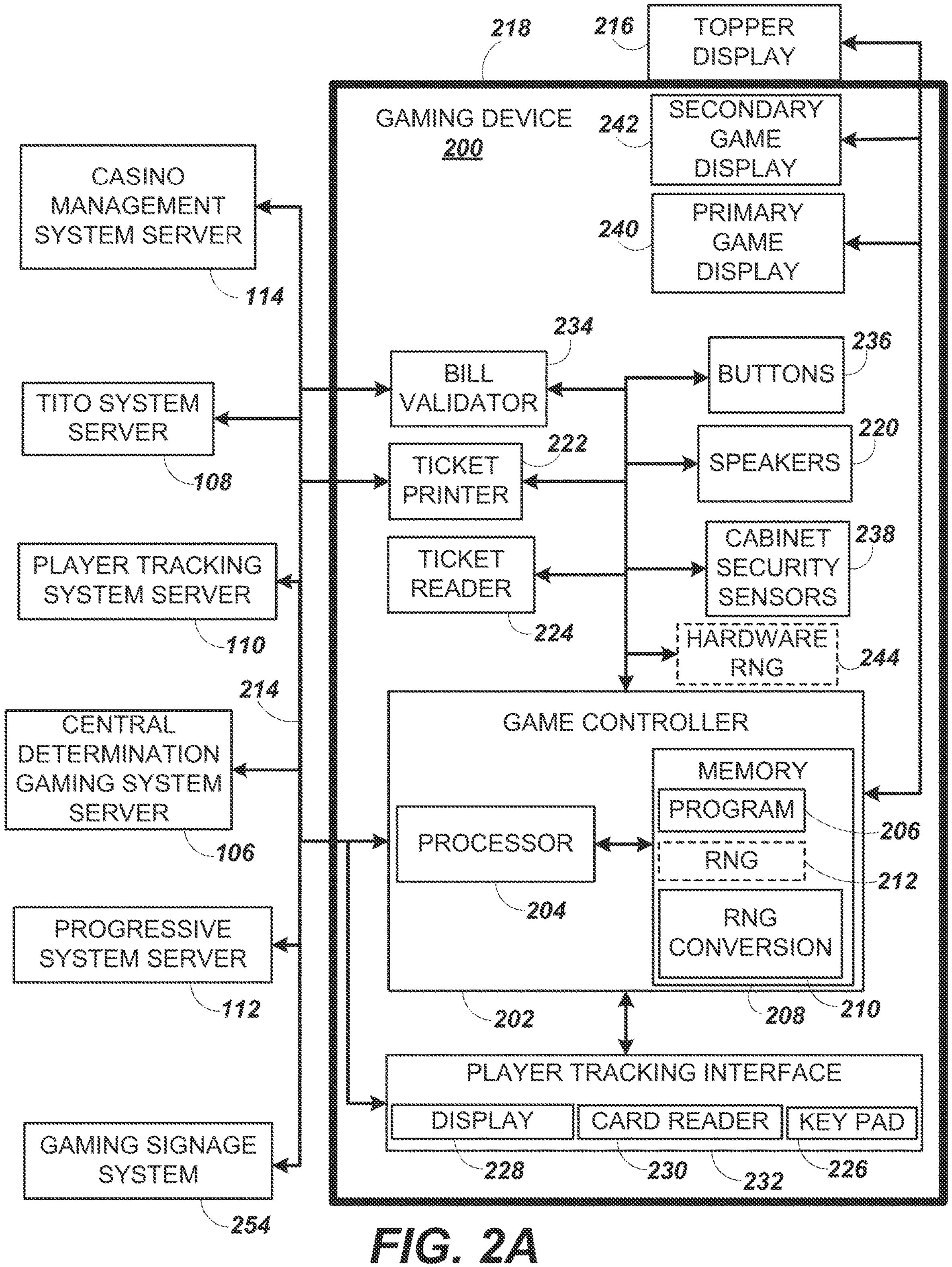
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI))

to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
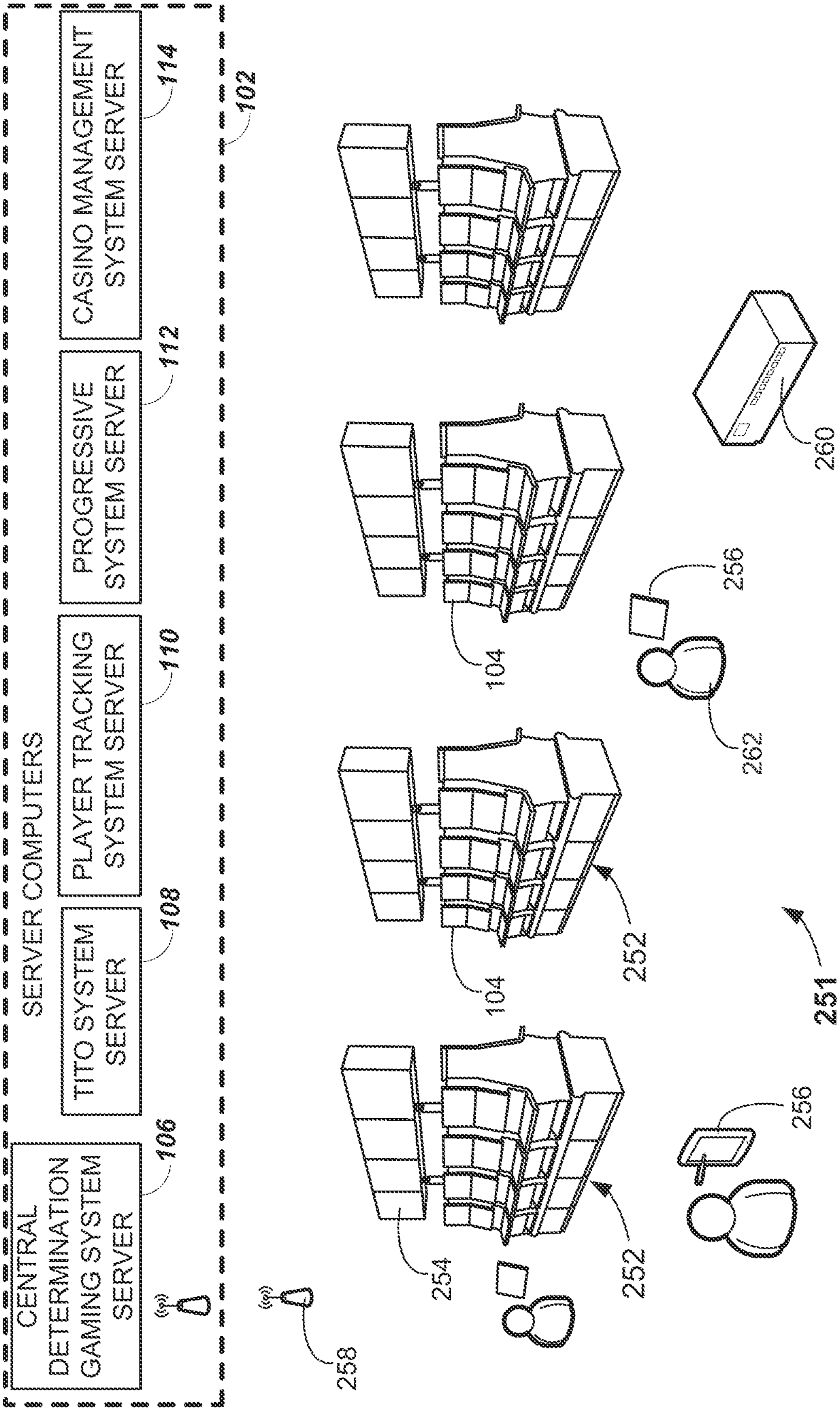
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
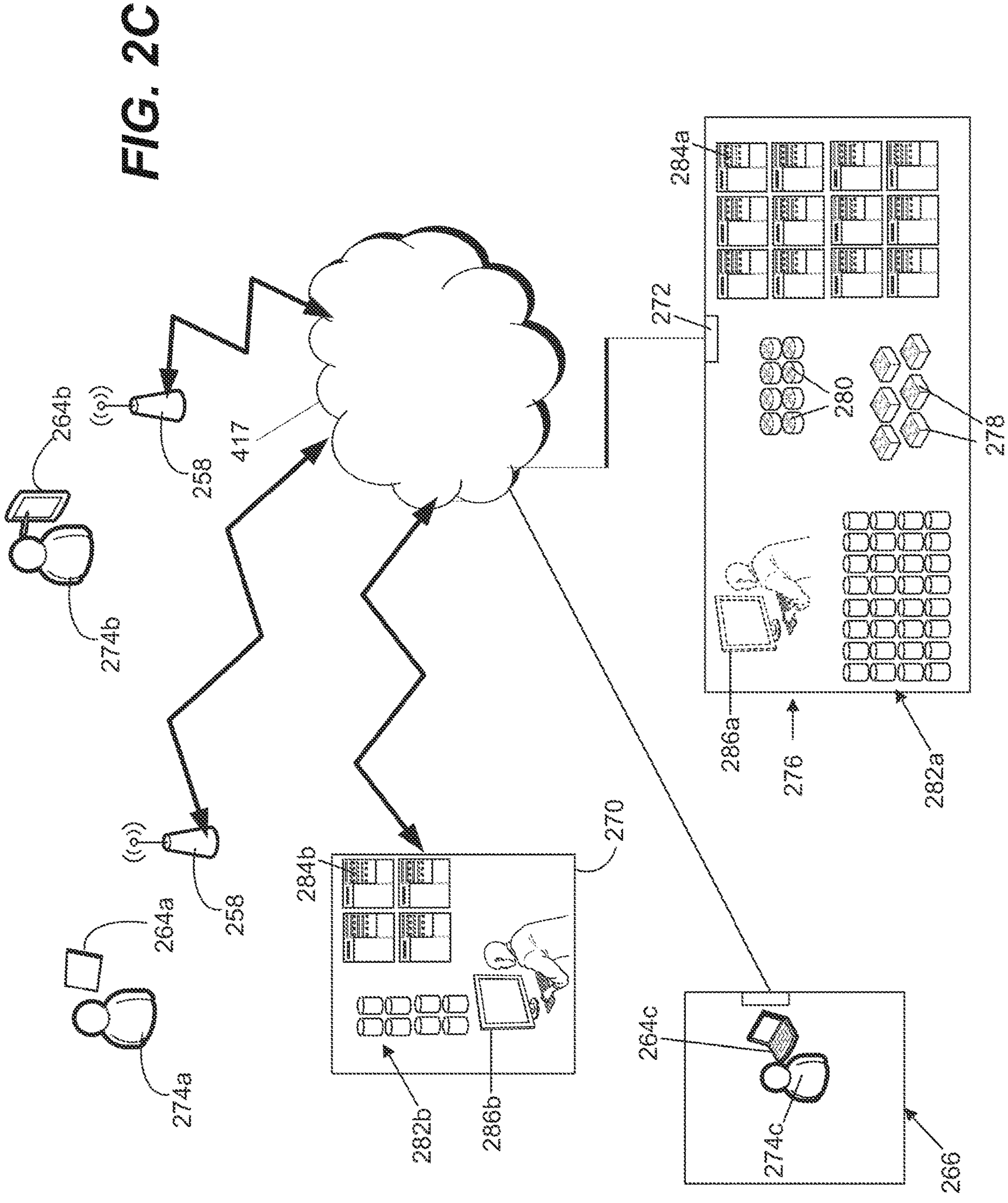
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
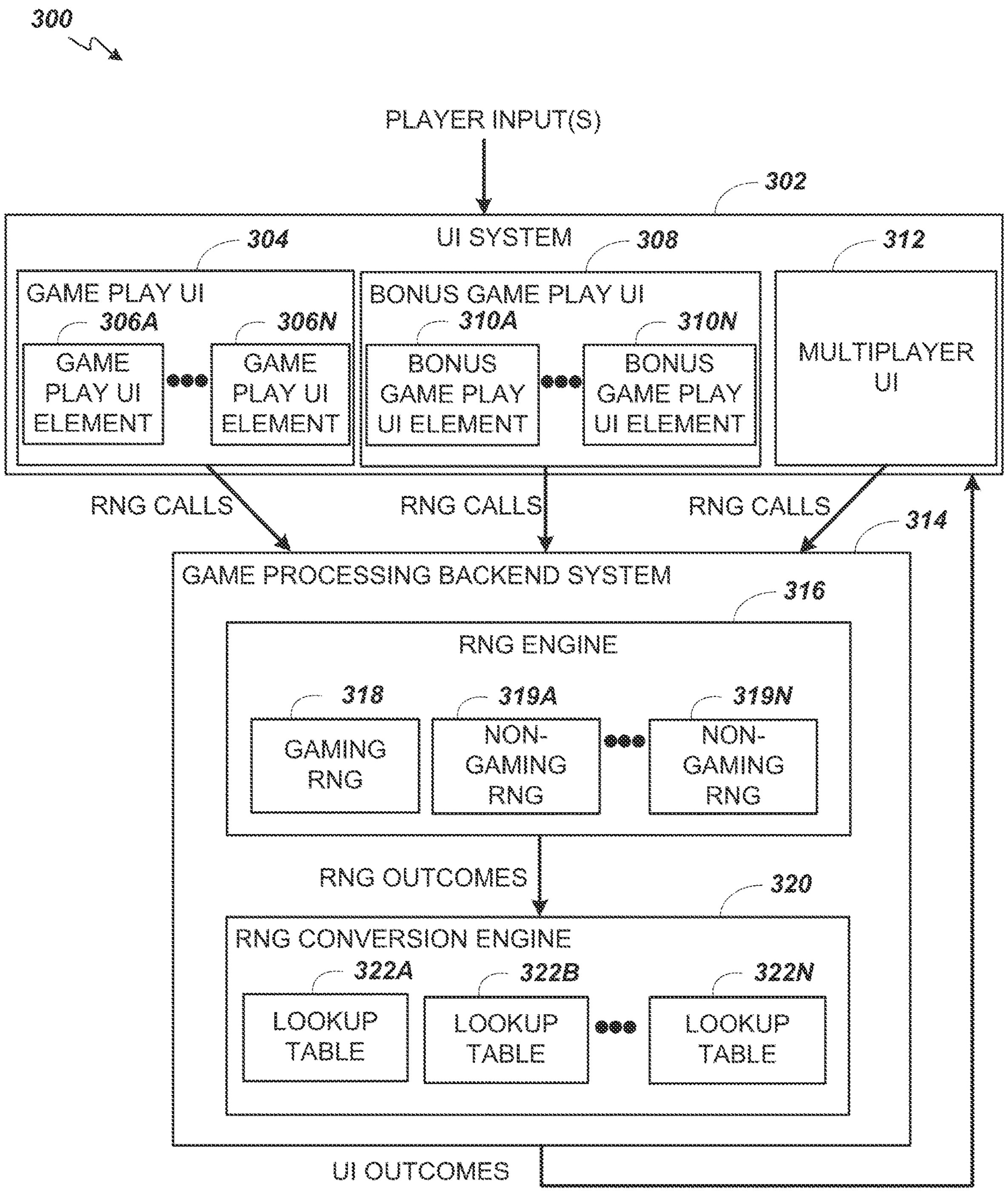
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
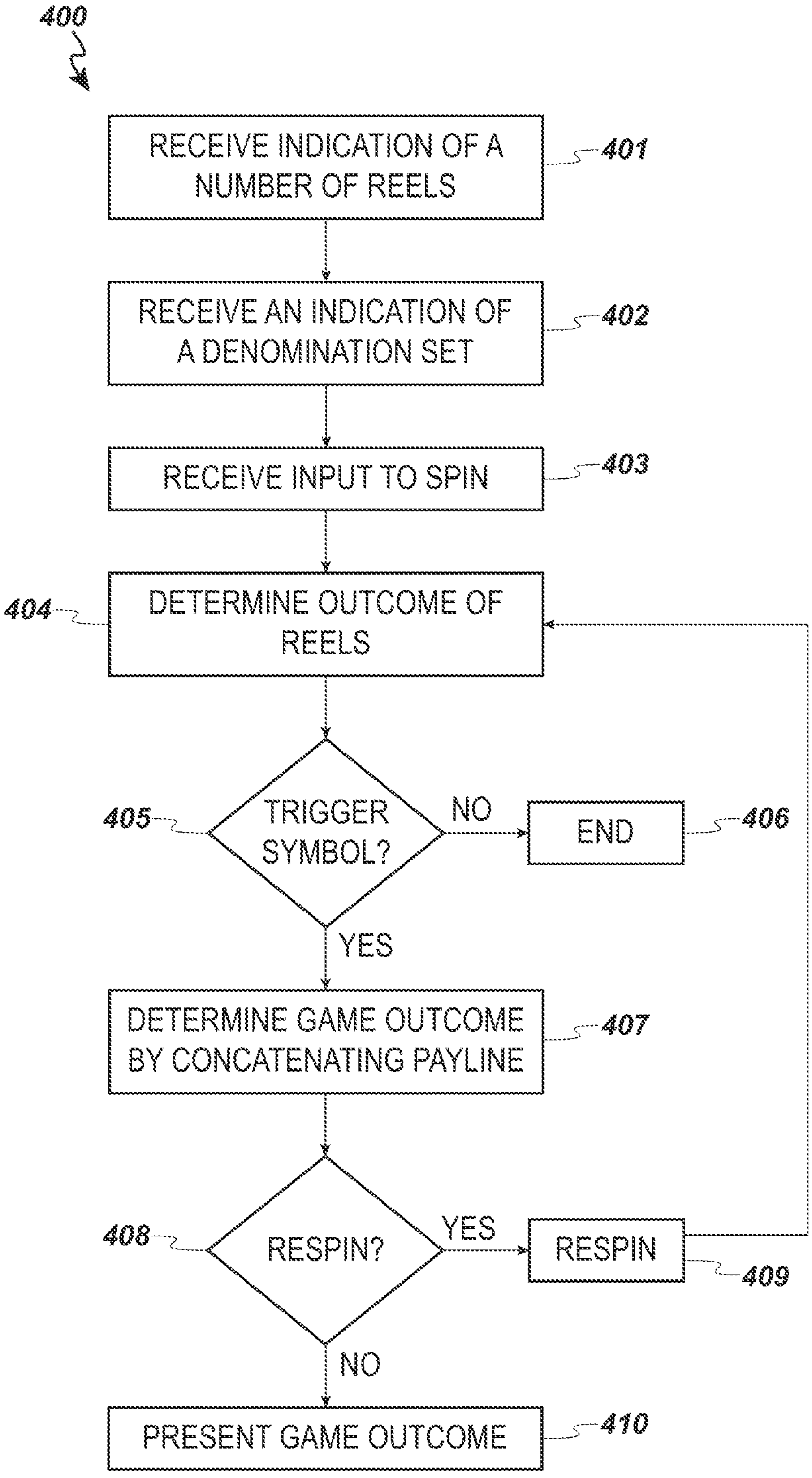
FIG. 4 depicts a flow chart illustrating a method for providing and/or operating a user-configurable slot type concatenation game. The method may be performed by and/or using one or more of the gaming devices and/or the gaming data center of FIGS. 1-2C and/or using the game processing architecture of FIG. 3.

FIG. 4 depicts a flow chart illustrating a method 400 for providing and/or operating a user-configurable slot type concatenation game. The method 400 may be performed by and/or using one or more of the gaming devices 104A-104X, 200 and/or the gaming data center 276 of FIGS. 1-2C and/or using the game processing architecture 300 of FIG. 3.

Figure 11:
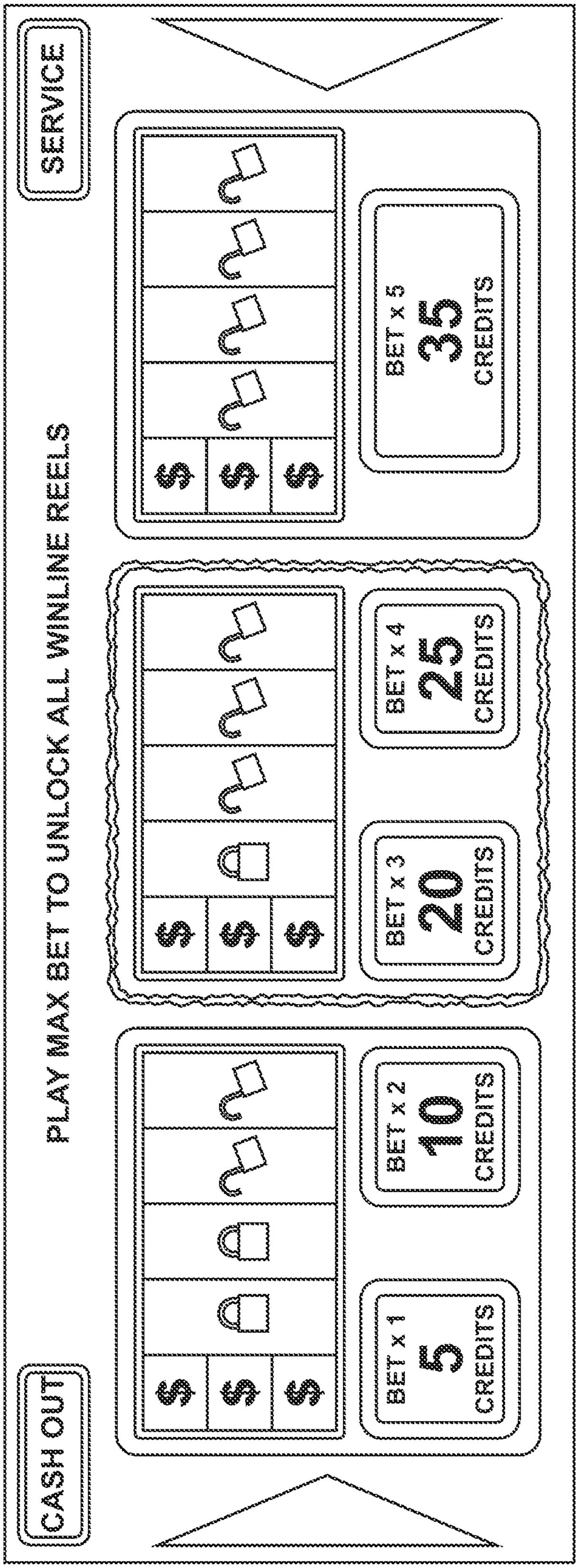
FIG. 11 depicts an example of an interface for receiving an indication of a number of reels from a player.

At operation 401, one or more electronic devices (such as one or more of the gaming devices 104A-104X, 200 and/or the gaming data center 276 of FIGS. 1-2C and/or using the game processing architecture 300 of FIG. 3) may receive an indication of a number of reels from a player using one or more user interface mechanisms. One such example interface is shown in FIG. 11. The indication of the number of reels may indicate a number of reels out a possible number of reels. Such user interface mechanisms may include, but are not limited to, one or more buttons, touch screens, and so on. The indication of the number of reels may be for a user-configurable slot type concatenation game. The slot type concatenation game may include one or more trigger reels, symbol reels, and/or other grid or matrix of symbols for which one or more symbol outcomes may be determined. The symbols may include value symbols (such as numerals) and nonvalue symbols (such as symbols other than numerals). The trigger reel and/or the symbol reels may be mechanical reels, virtual reels presented on a display, and so on.

Figure 12:
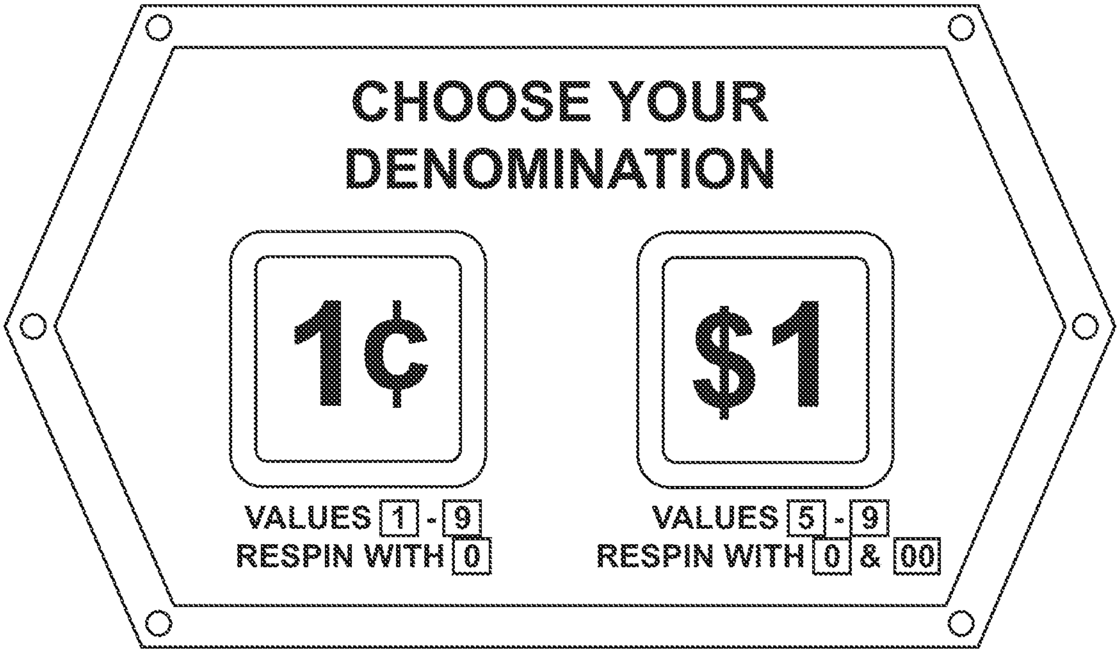
FIG. 12 depicts an example of an interface for receiving an indication of a denomination set from a player.

At operation 402, the electronic device may receive an indication of a denomination set via one or more user interface mechanisms. The indication of the denomination set may indicate a particular denomination set out of a number of possible denomination sets. For example, the indication of the denomination set may be a first denomination set or a second denomination set where the first denomination set is a set of lower denominations (or values) with respect to the second denomination set and the second denomination set is a set of higher denominations (or values) with respect to the first denomination set. The user interface mechanisms used to receive the indication of the denomination set may be the same user interface mechanisms used to receive the indication of the number of reels, different user interface mechanisms than those used to receive the indication of the number of reels, and/or a combination thereof. One such example interface is shown in FIG. 12.

For example, a slot type concatenation game may include a number of symbol reels, such as four, and a number of denomination sets, such as a lower denomination set and a higher denomination set. The indication of the number of reels may include one, two, three, or four of the symbol reels and the indication of the denomination set may include the lower denomination set or the higher denomination set.

By way of illustration, the indication of the number of reels may correspond to a bet level. One or more first or minimum bet levels may indicate a first number of symbol reels, such as one or two. One or more second bet levels may indicate a second number of symbol reels that is greater than the first number, such as a bet level that indicates three of the symbol reels and a maximum bet level that includes all of the symbol reels.

The electronic device may configure the number of the reels (such as the symbol reels) and/or one or more additional reels using value symbols according to the indicated denomination set. The value symbols may be obtained from one or more tables or other data structures that may be stored in one or more non-transitory storage media. Such tables may be constructed such that the configuration of the number of the reels and/or one or more additional reels using such maintains particular probabilities of particular game outcomes. The configuration of the number of reels may be determined using a RNG, and be designed to return a certain percentage of the amount wagered back to the player over the course of many plays or instances of the slot type concatenation game, which is generally referred to as "RTP."

By way of illustration, a slot type concatenation game may include a lower denomination set and a higher denomination set. Indication of the lower denomination set may configure the symbol reels using value symbols selected from the set of the numerals 0-5 and indication of the higher denomination set may include the set of the numerals 00 and 0-9. Various configurations are possible and contemplated without departing from the scope of the present disclosure. One such configuration may include more trigger symbols or a higher likelihood of landing a trigger symbol on the one or more trigger reels for the higher denomination set as compared to the lower denomination set.

Configuration of the number of the reels may also include configuring one or more trigger reels. Configuration of a trigger reel may include configuring the trigger reel with one or more trigger symbols and/or one or more non-trigger symbols. Examples of trigger symbols may include a $ symbol, any other currency indicator, and/or any other symbol that is selected as a trigger symbol. The proportion of trigger symbols to non-trigger symbols and/or the position of trigger symbols and/or non-trigger symbols on the trigger reel may be chosen to maintain particular probabilities of particular game outcomes.

The presence of a trigger symbol in a trigger reel outcome may indicate one or more paylines. For example, the position of symbols on one or more symbol reels may correspond to the position of a trigger symbol on a trigger reel. These corresponding positions may indicate one or more paylines. For example, the trigger reel and symbol reels may define one or more rows and columns and presence of a trigger symbol on the trigger reel may indicate a payline corresponding to the symbols on the symbol reels on such rows or columns, such as across, up and down, diagonally, and so on. Various configurations are possible and contemplated without departing from the scope of the present disclosure.

In some examples, the symbol reels may include one or more nonvalue symbols prior to configuration using the value symbols. Alternatively, in other examples, configuration of the symbol reels using the value symbols may also configure the symbol reels using nonvalue symbols. Such nonvalue symbols may be obtained from the same tables or other data structures used to obtain the value symbols, different tables or other data structures than those used to obtain the value symbols, and/or a combination thereof.

In various examples, the symbol reels may be physical reels or virtual reels that may be configurable (such as physical reels that include display elements that can be configured to display different symbols, virtual reels that can be displayed as including different symbols, and so on) to display different symbols at different positions based upon the configuration discussed above. In other examples, the symbol reels may be physical reels or virtual reels that include a fixed set of symbols at fixed positions. In such other examples, configuration of such fixed physical and/or virtual reels may include configuring stopping possible positions for the reels that only include the configured symbols and not the non-configured symbols. Various configurations are possible and contemplated without departing from the scope of the present disclosure.

At operation 403, the electronic device may receive an indication to spin the reels and/otherwise initiate play of the slot type concatenation game. The user interface mechanisms used to receive the indication to spin the reels and/otherwise initiate play of the slot type concatenation game may be the same user interface mechanisms used to receive the indication of the number of reels and/or receive the indication of the denomination set, different user interface mechanisms than those used to receive the indication of the number of reels and/or receive the indication of the denomination set, and/or a combination thereof.

Although the method 400 illustrates operations 401 through 403 as separate, linearly performed operations, it is understood that this is an example. In other implementations, other configurations or sequences are possible and contemplated. For example, in some implementations, receipt of an indication to spin the reels and/or otherwise initiate play of the slot type concatenation game without indications of the number of reels and/or the denomination set may be interpreted as indicating a default number of the reels and/or the denomination set (such as corresponding to minimum values for these indications, maximum values for these indications, mid-range values for these indications, and so on). Various configurations are possible and contemplated without departing from the scope of the present disclosure.

At operation 404, the electronic device may determine the outcome of the reels. This may involve determining the outcome of one or more symbol reels, one or more trigger reels, and so on. For example, the outcome of the one or more symbol reels and/or the one or more trigger reels may be determined using a RNG to randomly determine the outcome of the symbol reels and/or the trigger reel so as to achieve a given level of volatility for a target level of RTP, such as using game processing backend system 314 which utilizes RNG conversion engine 320. The RTP and randomness of the RNG ensure the fairness of games and are highly regulated. Upon initiation of play, the RNG may randomly determine one or more symbol reel and/or trigger reel stop positions and symbols may then be displayed which correspond to those stop positions. Various configurations are possible and contemplated without departing from the scope of the present disclosure.

In various examples, the outcome of the trigger reel may be determined separately from the outcome of the symbol reels. For example, the two or more outcomes may be determined separately using the RNG in order to achieve a given level of volatility for a target level of RTP in a way that neither of the two outcomes are dependent upon each other. In other examples, the two outcomes may be determined separately using the RNG in order to achieve a given level of volatility for a target level of RTP in a way that a second of the two outcomes is determined dependent upon the first of the two outcomes. In still other example, the two outcomes may be the result of a single determination that includes the symbol reel outcome and the trigger outcome and is determined using the RNG in order to achieve a given level of volatility for a target level of RTP. Various configurations are possible and contemplated without departing from the scope of the present disclosure. In various configurations, the outcome of each reel, including the one or more trigger reel and the symbol reel is determined by a separate RNG call.

The electronic device may present the outcome of the symbol reels and the trigger reel. For example, the outcome of the symbol reels and the trigger reel may include determining a position at which to stop the symbol reels and the trigger reel and presenting that outcome may include physically and/or virtually spinning the symbol reels and the trigger reel and stopping the symbol reels and the trigger reel at the determined position. In some examples, the symbol reels and the trigger reel may all spin and stop simultaneously. In other examples, various of the symbol reels and the trigger reel may spin and stop at different times.

In some examples, the indicated number of symbol reels may be less than the possible number of symbol reels and the electronic device may present the outcome of the indicated number of symbol reels along with the outcome of one or more non-indicated symbol reels. This may enable a player to know what the outcome would have been had the non-indicated symbol reels also been indicated. The electronic device may present an indication that such non-indicated symbol reels are inactive. For example, the non-indicated symbol reels may be grayed out. Alternatively, the indicated symbol reels may be illuminated whereas the non-indicated symbol reels may not be illuminated. Various configurations are possible and contemplated without departing from the scope of the present disclosure.

In other examples, the indicated number of symbol reels may be less than the possible number of symbol reels and the electronic device may not present the outcome of the indicated number of symbol reels along with the outcome of one or more non-indicated symbol reels. By way of illustration, the non-indicated symbol reels may be presented as blank. By way of another illustration, the non-indicated symbol reels may be presented but may be configured to only include nonvalue symbols instead of value symbols and nonvalue symbols. Various configurations are possible and contemplated without departing from the scope of the present disclosure.

At operation 405, the electronic device may determine whether one or more trigger symbols are present in the outcome of the trigger reel. The electronic device may determine that the slot type concatenation game is a not a winner when a trigger symbol is not present, the other symbols being ignored. If the electronic device determines that a trigger symbol is not present, the flow may proceed to operation 406 and end. Otherwise, the flow may proceed to operation 407. In various configurations, an award amount may be determined based on the symbols displayed by the reels forming winning outcomes based on one or more paytables for the game. For example, the game may use paylines to evaluate symbols for winning combinations. The game may alternatively, or additionally, use ReelPower determinations to determine an award amount.

At operation 407, the electronic device may determine a game outcome. In some examples, the electronic device may determine whether the slot type concatenation game is a winner or not based on the presence of value symbols other than just 0 or 00 in the symbol reel outcomes of the number of the symbol reels along a payline indicated by the trigger symbol present on the trigger reel (the other symbols being ignored). In various examples, the electronic device may determine the game outcome by concatenating a number of value symbols present in the symbol reel outcomes of the number of the symbol reels along a payline indicated by the trigger symbol present on the trigger reel.

In some examples, the symbol reel outcomes of the number of the symbol reels along the payline may all include value symbols and the electronic device may determine the game outcome by concatenating all of those value symbols. The electronic device may concatenate the value symbols in order from closest in proximity to the trigger symbol to the value symbol furthest from the trigger symbol. Various configurations are possible and contemplated without departing from the scope of the present disclosure.

By way of illustration, slot type games conventionally compare symbols on symbol reels along a payline to a symbol table correlating groups of symbols to monetary and/or other awards. As the present application concatenates value symbols and ignores non-value symbols along the payline, the conventional technique may not be useful and/or may not be computationally efficient.

Instead, the present application may concatenate the value symbols along the payline by determining the number of value symbol digits along the payline, multiply the value symbol digits by increasing powers of ten corresponding to the digit number from left to right (such as 10^0 for the first nonzero value symbol digit, 10^1 for the second, 10^2 for the third, and so on and then sum the products of the individually multiplies value symbol digits. For example, a result of 77D7 may result in 7*10^2+7*10^1+7*10^0, or 700+70+7, or 777. In some examples, zero value symbols may not be multiplied by a power of ten corresponding to their digit position and instead the powers of ten by which the other non-zero value symbol digits may be increased accordingly (such as 10^1 for the first nonzero value symbol digit, 10^2 for the second, 10^3 for the third, and so on when the first value symbol digit is zero; 10^2 for the first nonzero value symbol digit, 10^3 for the second, 10^4 for the third, and so on when the first value symbol digit is double zero; and so on). This unconventional technical solution to concatenating the value symbols along the payline may improve the operation of a computer and/or other processing unit and/or similar device that concatenates the value symbols along the payline by simplifying the operations performed to concatenate the value symbols along the payline, avoid storage of a symbol table, and so on.

In other examples, the symbol reel outcomes of the number of the symbol reels along the payline may all include a number of value symbols and a number of nonvalue symbols. In such examples, the electronic device may determine the game outcome by omitting the nonvalue symbols and concatenating the value symbols that remain. The electronic device may concatenate the value symbols in order from closest in proximity to the trigger symbol to the value symbol furthest from the trigger symbol. Various configurations are possible and contemplated without departing from the scope of the present disclosure.

In various examples, the electronic device may evaluate other factors beyond the presence of value symbols in a payline indicated by the presence of a trigger symbol on the trigger reel in determining the game outcome. For example, the electronic device may additionally and/or alternatively determine the game outcome using the mechanics of another kind of slot type game based upon nonvalue symbols and/or a combination of nonvalue symbols and value symbols, such as nonvalue symbols and/or a combination of nonvalue symbols and value symbols present along a payline indicated by the presence of a trigger symbol on the trigger reel. Various configurations are possible and contemplated without departing from the scope of the present disclosure.

In some examples, the electronic device may generate a modified game outcome in response to the presence of one or more nonvalue symbols, such as nonvalue symbols present along a payline indicated by the presence of a trigger symbol on the trigger reel. Such nonvalue symbols may correspond to a multiplier and/or other enhancer and/or modifier that may be used to multiply and/or otherwise enhance and/or modify an award corresponding to the game outcome. In some examples, such nonvalue symbols may be standalone nonvalue symbols. In other examples, such nonvalue symbols may be combinations of nonvalue symbols, such as letters and/or groups of letters that may be concatenated to form a combination of nonvalue symbols corresponding to a multiplier and/or other enhancer and/or modifier. By way of illustration, nonvalue symbols “mult” and “iply” may be concatenated to form a combination of nonvalue symbols corresponding to a multiplier. Various configurations are possible and contemplated without departing from the scope of the present disclosure.

Alternatively and/or additionally, the electronic device may perform other actions in response to the presence of one or more nonvalue symbols, such as nonvalue symbols present along a payline indicated by the presence of a trigger symbol on the trigger reel and/or nonvalue symbols otherwise present in the outcome of one or more symbol reels whether or not a trigger symbol is evaluated to be present. Such nonvalue symbols may correspond to a nonvalue symbol corresponding to a respin, game credit, free game, bonus game, progressive jackpot, and so on. In some examples, such nonvalue symbols may be standalone nonvalue symbols. In other examples, such nonvalue symbols may be combinations of nonvalue symbols, such as letters and/or groups of letters that may be concatenated to form a combination of nonvalue symbols corresponding to a respin, game credit, free game, bonus game, progressive jackpot, and so on. By way of illustration, nonvalue symbols “free” and “game” may be concatenated to form a combination of nonvalue symbols corresponding to a free game. By way of illustration, nonvalue symbols “gr,” “an,” and “d” may be concatenated to form a combination of nonvalue symbols corresponding to a progressive jackpot. Various configurations are possible and contemplated without departing from the scope of the present disclosure.

Alternatively and/or additionally, the game outcome (and/or the outcome of the reels and/or one or more other outcomes) may correspond to results of one or more bingo games. By way of illustration, receipt of player input to initiate a slot type game, indicate a number of reels, indicate a denomination set, and/or spin one or more reels may enter the player in the bingo game. The result of the bingo game may be determined and the game outcome (and/or the outcome of the reels and/or one or more other outcomes) may be selected and/or presented that corresponds to the result of the bingo game (such as one or more facades or slot type game screens that have an outcome matching that of the result of the bingo game). Various configurations are possible and contemplated without departing from the scope of the present disclosure.

At operation 408, the electronic device may determine whether or not to respin and/or otherwise replay the slot type concatenation game. If so, the flow may proceed to operation 409 where the electronic device respins and/or otherwise replays the slot type concatenation game before the flow proceeds to operation 404. Otherwise, the flow may proceed to operation 410.

The electronic device may determine to respin and/or otherwise replay the slot type concatenation game in response to the presence of a respin symbol present in the payline and/or otherwise present on one or more of the reels. Such a respin symbol may be one or more of a value symbol, a nonvalue symbol, and so on. Various configurations are possible and contemplated without departing from the scope of the present disclosure.

For example, the electronic device may interpret a 0 or a 00 along a payline indicated by a trigger symbol as a respin symbol. In some such examples, the electronic device may interpret a 0 or a 00 along a payline indicated by a trigger symbol as a respin symbol when no other value symbols are present along the payline. In various examples where the value symbols used to configure the symbol reels include 0 when a first denomination set is indicated and 0 and 00 when a second denomination set is indicated, interpretation of 0 and 00 as respin symbols may mean that indication of the second denomination set provides greater probability of the electronic device determining to respin that indication of the first denomination set. Various configurations are possible and contemplated without departing from the scope of the present disclosure.

At operation 410, the electronic device may present the game outcome. For example, the electronic device may indicate whether or not the game is a winner, an amount won, a current credit amount, and so on.

In this way, the technique for providing the user-configurable slot type concatenation game discussed herein may provide unconventional technical solutions to the technical problem of how to implement slot type concatenation games with different numbers of reels and/or different sets of value symbols without requiring multiple game machines and/or storage of multiple games by game machines and/or storage that supports game machines. These techniques may greatly expand the game capabilities of the slot type concatenation game and/or the functions performable related to the slot type concatenation game and may also improve the operation of the devices and/or systems that implement the slot type concatenation game by reducing duplicate hardware (such as over implementations that require multiple game machines) and/or software (such as over implementations that require storage of multiple games by game machines and/or storage that supports game machines), eliminating more resource consumptive solutions to the above issues, and so on. Such capabilities may greatly extend the useful life of the slot type concatenation game and/or greatly delay the time when the game machine involved in the slot type concatenation game may be replaced.

Although the example method 400 is illustrated and described as including particular operations performed in a particular order, it is understood that this is an example. In various implementations, various orders of the same, similar, and/or different operations may be performed without departing from the scope of the present disclosure.

For example, the method 400 illustrates and describes the operation 407 of determining a game outcome being performed after a trigger symbol is determined to be present in the outcome of the trigger reel in operation 405. However, it is understood that this is an example. In various implementations, determination of whether or not a trigger symbol is present may be part of determining a game outcome. In various other implementations, a game outcome may be determined whether or not a trigger symbol is determined to be present. Various configurations are possible and contemplated without departing from the scope of the present disclosure.

By way of another example, the method 400 is illustrated and described as including operations 401 through 403. However, it is understood that this is an example. In other implementations, receipt of an indication to spin the reels and/or otherwise initiate play of the slot type concatenation game without indications of the number of reels and/or the denomination set may be interpreted as indicating a default number of the reels and/or the denomination set (such as corresponding to minimum values for these indications, maximum values for these indications, mid-range values for these indications, and so on). Various configurations are possible and contemplated without departing from the scope of the present disclosure.

In still another example, the method 400 is illustrated and described as including operations 408 and 409. However, it is understood that this is an example. In other implementations, such operations may be omitted, performed at different times, and so on. Various configurations are possible and contemplated without departing from the scope of the present disclosure.

In yet another example, the method 400 is illustrated and described as including operations that are performed in a particular order. However, it is understood that this is an example. In some implementations, the order of these operations may be performed in any other order. By way of illustration, in a number of implementations, operation 401 may be performed after operation 402 is performed. Various configurations are possible and contemplated without departing from the scope of the present disclosure.

In still another example, the operation 405 is illustrated and described as determining whether or not a trigger symbol is present in the outcome of the trigger reel. However, it is understood that this is an example. In some implementations, multiple trigger symbols may be present on the trigger reel and may be present in the outcome of the trigger reel. This may create multiple awards, one for each trigger symbol. Various configurations are possible and contemplated without departing from the scope of the present disclosure.

Figure 5A:
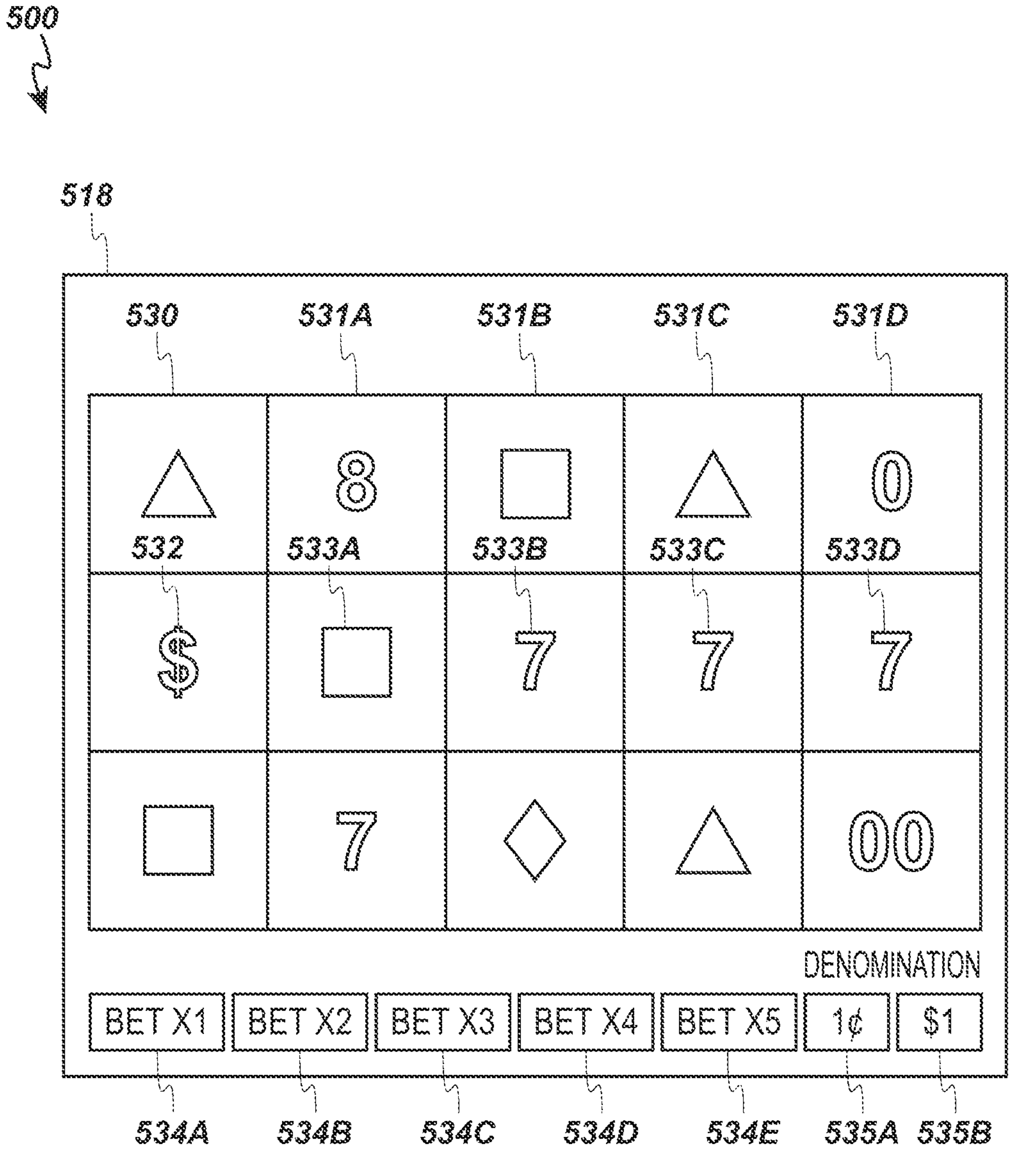
FIG. 5A depicts an example of play of an example user-configurable slot type concatenation game. This example user-configurable slot type concatenation game may be provided by and/or operated using the method of FIG. 4.

FIG. 5A depicts an example of play 500 of an example user-configurable slot type concatenation game. This example user-configurable slot type concatenation game may be provided by and/or operated using the method of FIG. 4. As illustrated, the example user-configurable slot type concatenation game may include a number of virtual reels presented on a display 518, such as a virtual trigger reel 530 and a number of virtual symbol reels (such as a first virtual symbol reel 531A, a second virtual symbol reel 531B, a third virtual symbol reel 531C, and a fourth virtual symbol reel 531D). The example user-configurable slot type concatenation game may also include a number of touch areas configured on the display 518, such as a Bet×1 touch area 534A (or minimum bet touch area), a Bet×2 touch area 534B, a Bet×3 touch area 534C, a Bet×4 touch area 534D, a Bet×5 touch area 534E (or a maximum bet touch area), a first denomination set (or a lower denomination set) touch area 535A, and a second denomination set (or higher denomination set) touch area 535B.

Although the example user-configurable slot type concatenation game is illustrated and described as including virtual reels displayed on the display 518 and touch areas configured on the display 518, it is understood that this is an example. In other implementations, physical reels may be used instead of the virtual reels and/or one or more buttons and/or other input mechanisms may be used instead of the touch areas configured on the display 518. Various configurations are possible and contemplated without departing from the scope of the present disclosure.

A player may indicate a number of the virtual symbol reels and select one of the Bet×1 touch area 534A, the Bet×2 touch area 534B, the Bet×3 touch area 534C, the Bet×4 touch area 534D, and the Bet×5 touch area 534E. The player may also indicate a denomination set by selecting one of the first touch area 535A and the second denomination touch area 535B. In this example, the player indicating the number of the virtual symbol reels and the denomination set may also indicate to spin the reels and/or otherwise initiate play of the slot type concatenation game. However, in other examples, the player may use another input mechanism to indicate to spin the reels and/otherwise initiate play of the slot type concatenation game.

The play 500 of the example user-configurable slot type concatenation game illustrates the trigger reel 531 and the virtual symbol reels after the player has selected the Bet×5 touch area 534E and the second denomination touch area 535B. In response, the virtual symbol reels were configured with value symbols according to the second set (such as using one or more tables of value symbols), and outcomes of the virtual trigger reel 530 and symbol reels were determined. As illustrated, the virtual symbol reels may include value symbols of 0-9 or 00 because the player selected the second denomination touch area 535B. As also illustrated, all of the virtual symbol reels may be active because the player selected the Bet×5 touch area 534E.

A game outcome for the play 500 of the example user-configurable slot type concatenation game may be determined by determining whether or not a trigger symbol is present on the virtual trigger reel 530 and concatenating value symbols along a payline indicated by that trigger symbol. As illustrated, the symbol 532 is a trigger symbol $. In this example, paylines correspond to the row occupied by a trigger symbol. However, in other examples, other paylines are possible (such as columns occupied by a trigger symbol, diagonals occupied by a trigger symbol, and so on). As the symbol 532 is a trigger symbol $ that occupies the middle row, symbol 532 indicates a payline corresponding to the middle row. The middle row includes a symbol 533A on the first virtual symbol reel 531A, a symbol 533B on the second virtual symbol reel 531B, a symbol 533C on the third virtual symbol reel 531C, and a symbol 533D on the fourth virtual symbol reel 531D. The symbol 533A is a nonvalue symbol and the symbols 533B-533D are all value symbols. As such, the game outcome for the play 500 of the example user-configurable slot type concatenation game may be determined by concatenating the symbols 533B-533D while omitting the symbol 533A.

Figure 5B:
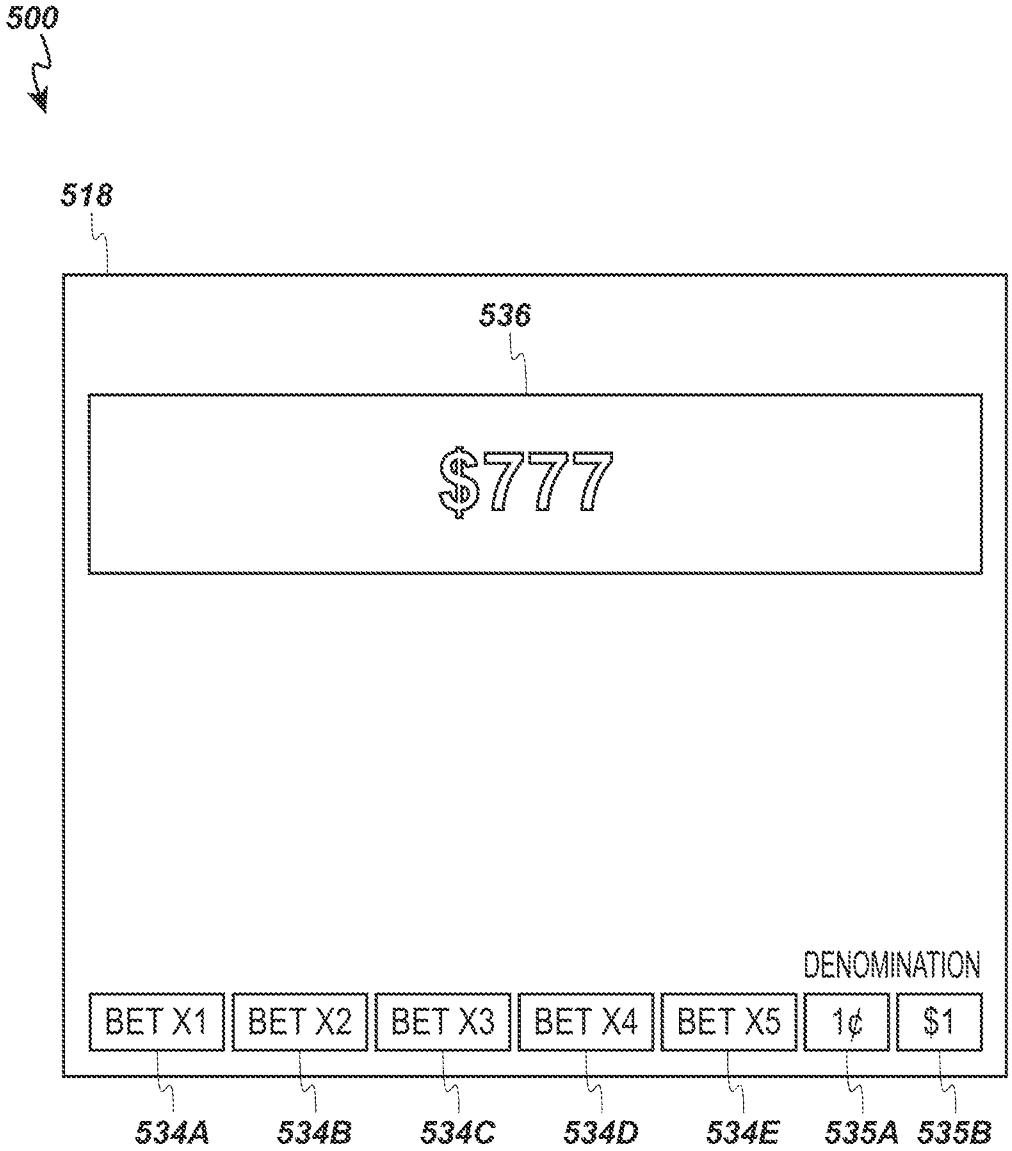
FIG. 5B depicts the example play of the example user-configurable slot type concatenation game of FIG. 5A after the game outcome is presented.

FIG. 5B depicts the example play 500 of the example user-configurable slot type concatenation game of FIG. 5A after the game outcome 536 is presented on the display 518. As illustrated, the game outcome 536 is an award of $777.

Figure 6:
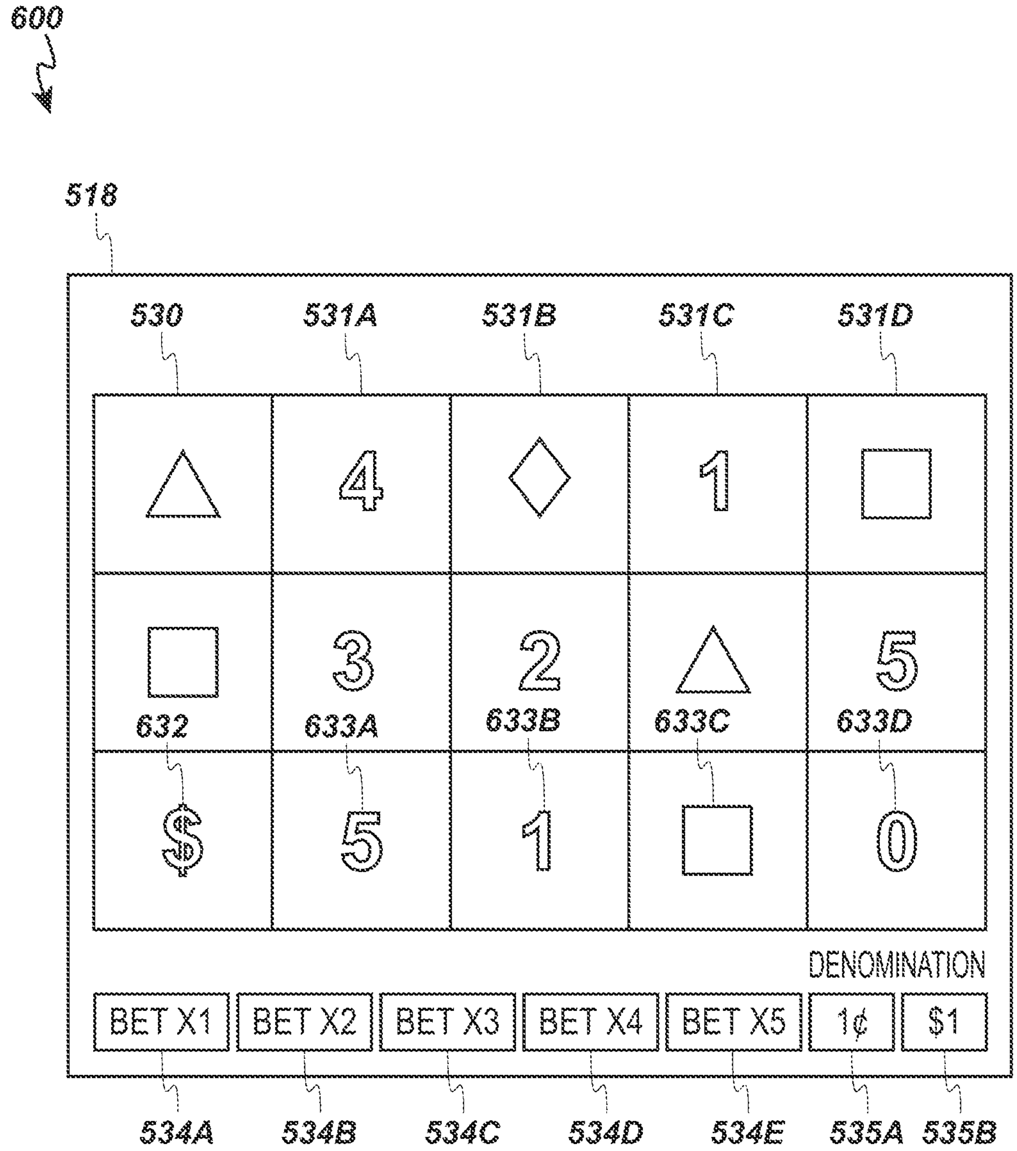
FIG. 6 depicts a subsequent play of the example user-configurable slot type concatenation game of FIG. 5A.

FIG. 6 depicts a subsequent play 600 of the example user-configurable slot type concatenation game of FIG. 5A. The play 600 of the example user-configurable slot type concatenation game illustrates the trigger reel 531 and the virtual symbol reels after the player has selected the Bet×5 touch area 534E and the first denomination touch area 535A. In response, the virtual symbol reels were configured with value symbols according to the first denomination set (such as using one or more tables of value symbols), and outcomes of the virtual trigger reel 530 and symbol reels were determined. As illustrated, the virtual symbol reels may include value symbols of 0-5 because the player selected the first denomination touch area 535A. As also illustrated, all of the virtual symbol reels may be active because the player selected the Bet×5 touch area 534E.

A game outcome for the play 600 of the example user-configurable slot type concatenation game may be determined by determining whether or not a trigger symbol is present on the virtual trigger reel 530 and concatenating value symbols along a payline indicated by that trigger symbol. As illustrated, the symbol 632 is a trigger symbol $. As the symbol 632 is a trigger symbol $ that occupies the bottom row, symbol 632 indicates a payline corresponding to the bottom row. The bottom row includes a symbol 633A on the first virtual symbol reel 531A, a symbol 633B on the second virtual symbol reel 531B, a symbol 633C on the third virtual symbol reel 531C, and a symbol 633D on the fourth virtual symbol reel 531D. The symbol 633C is a nonvalue symbol and the symbols 633A-633B and 633D are all value symbols. As such, the game outcome for the play 600 of the example user-configurable slot type concatenation game may be determined by concatenating the symbols 633A-633B and 633D while omitting the symbol 633C.

Figure 7:
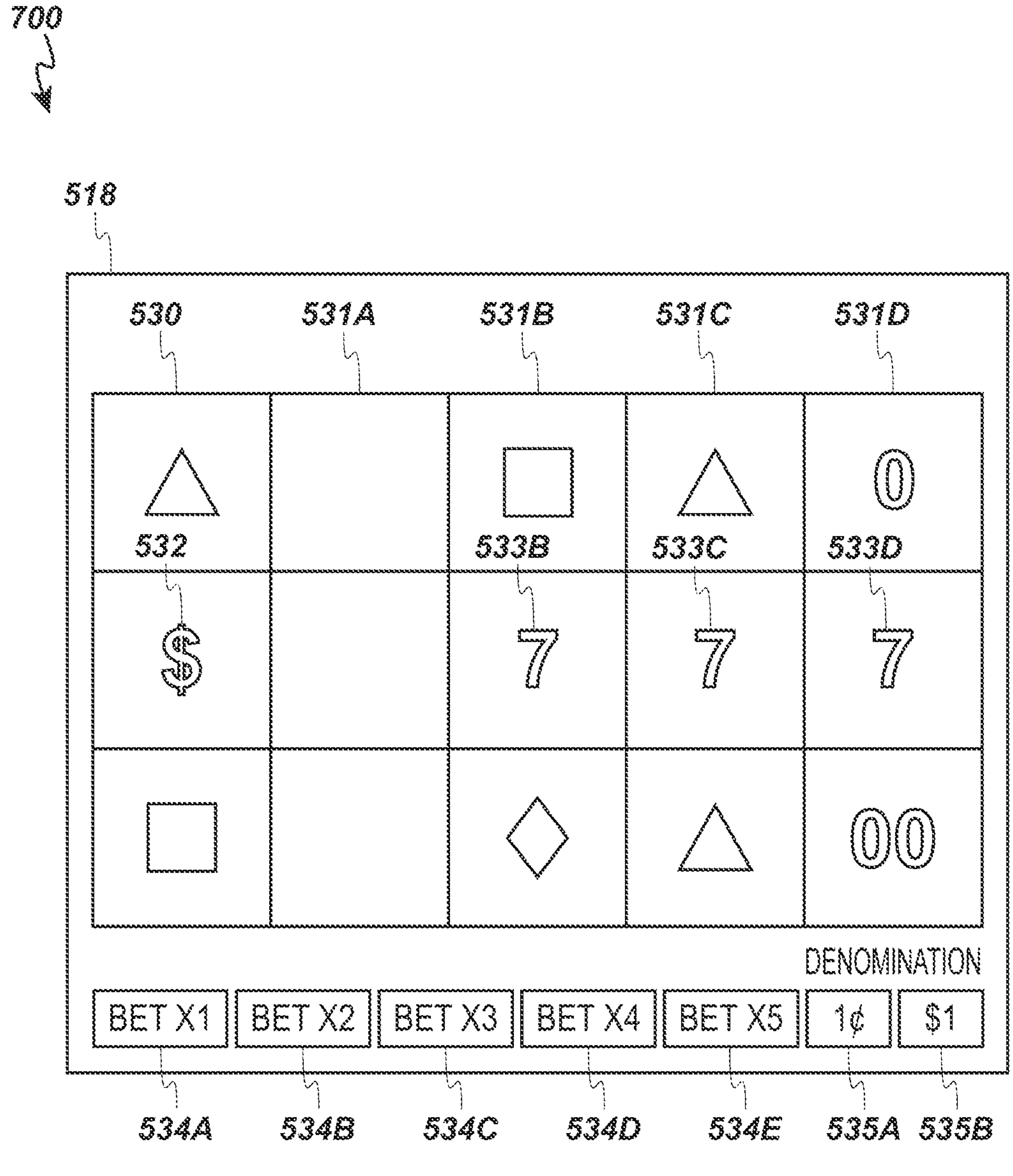
FIG. 7 depicts a first alternative example of play of the example user-configurable slot type concatenation game of FIG. 5A.

FIG. 7 depicts a first alternative example of play 700 of the example user-configurable slot type concatenation game of FIG. 5A. The play 700 of the example user-configurable slot type concatenation game illustrates the trigger reel 531 and the virtual symbol reels after the player has selected either the Bet×3 touch area 534C or the Bet×4 touch area 534D and the second denomination touch area 535B. In response, the virtual symbol reels were configured with value symbols according to the second denomination set (such as using one or more tables of value symbols), and outcomes of the virtual trigger reel 530 and symbol reels were determined. As illustrated, the virtual symbol reels may include value symbols of 0-9 or 00 because the player selected the second denomination touch area 535B. As also illustrated, the second virtual symbol reel 531B, the third virtual symbol reel 531C, and the fourth virtual symbol reel 531D may be active because the player selected either the Bet×3 touch area 534C or the Bet×4 touch area 534D.

The first virtual symbol reel 531A is illustrated as blank because the first virtual symbol reel 531A is inactive. However, it is understood that this is an example. In other examples, inactive virtual symbol reels may be configured to only include nonvalue symbols instead of value symbols and nonvalue symbols. Various configurations are possible and contemplated without departing from the scope of the present disclosure.

In still other examples, the outcomes of inactive virtual symbol reels may be presented along with the outcomes of active virtual symbol reels to enable a player to know what the outcome would have been had the non-indicated virtual symbol reels also been indicated. In yet other examples, inactive virtual reels may be indicated by other mechanisms other than blanking. By way of illustration, inactive virtual symbol reels may be grayed out. By way of another illustration, active virtual symbol reels may be illuminated whereas inactive virtual symbol reels may not be illuminated. Various configurations are possible and contemplated without departing from the scope of the present disclosure.

A game outcome for the play 700 of the example user-configurable slot type concatenation game may be determined. As illustrated, the symbol 532 is a trigger symbol $. As the symbol 532 is a trigger symbol $ that occupies the middle row, symbol 532 indicates a payline corresponding to the middle row. The middle row includes a symbol 533B on the second virtual symbol reel 531B, a symbol 533C on the third virtual symbol reel 531C, and a symbol 533D on the fourth virtual symbol reel 531D. The symbols 533B-533D are all value symbols. As such, the game outcome for the play 700 of the example user-configurable slot type concatenation game may be determined by concatenating the symbols 533B-533D. This game outcome yields an award of $777, just like the play 500 of FIGS. 5A and 5B.

Figure 8:
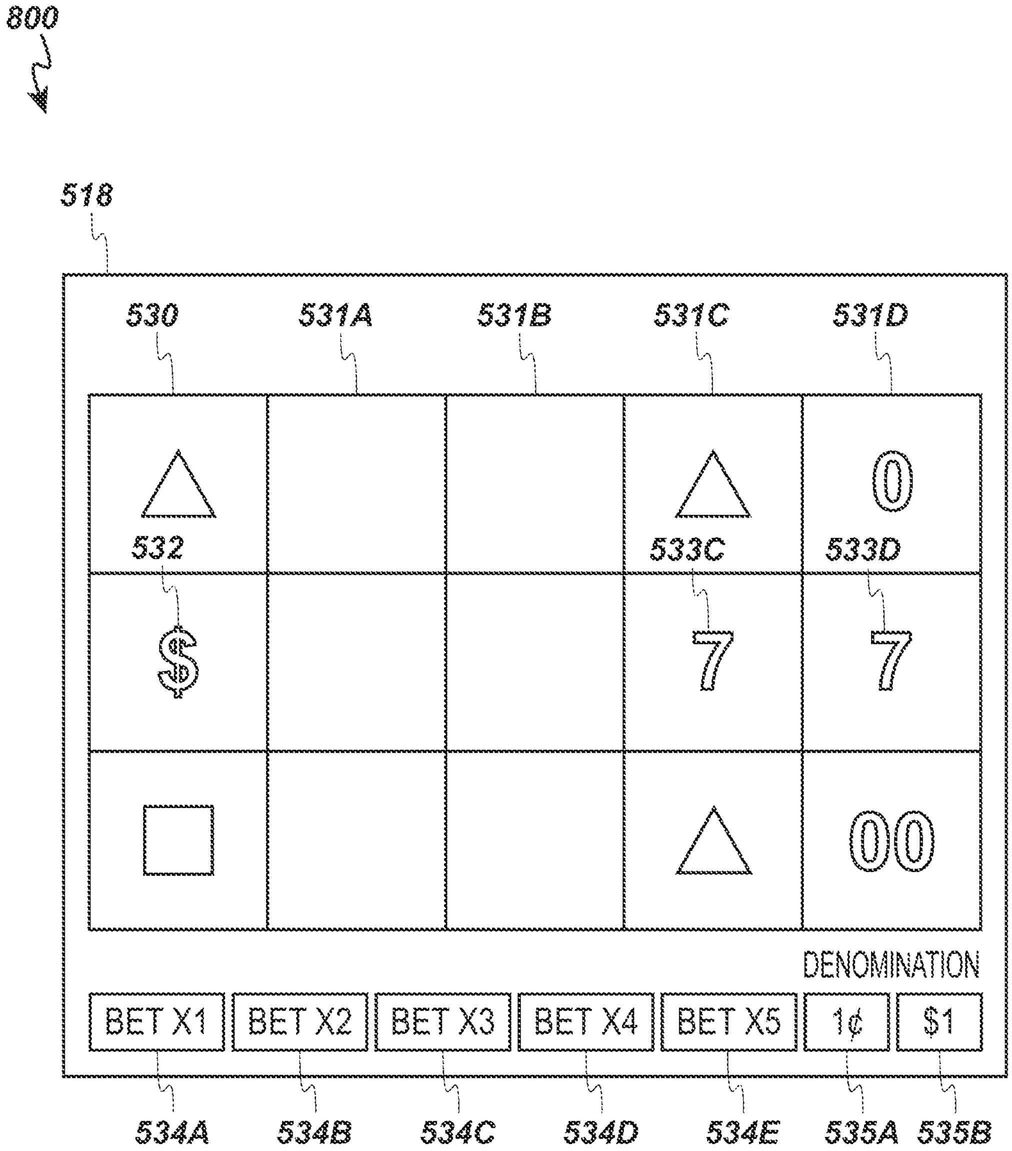
FIG. 8 depicts a second alternative example of play of the example user-configurable slot type concatenation game of FIG. 5A.

FIG. 8 depicts a second alternative example of play 800 of the example user-configurable slot type concatenation game of FIG. 5A. The play 800 of the example user-configurable slot type concatenation game illustrates the trigger reel 531 and the virtual symbol reels after the player has selected either the Bet×1 touch area 534A or the Bet×2 touch area 534B and the second denomination touch area 535B. In response, the virtual symbol reels were configured with value symbols according to the second set (such as using one or more tables of value symbols), and outcomes of the virtual trigger reel 530 and symbol reels were determined. As illustrated, the virtual symbol reels may include value symbols of 0-9 or 00 because the player selected the second denomination touch area 535B. As also illustrated, the third virtual symbol reel 531C, and the fourth virtual symbol reel 531D may be active because the player selected either the Bet×1 touch area 534A or the Bet×2 touch area 534B.

The first virtual symbol reel 531A and the second virtual symbol reel 531B are illustrated as blank because the first virtual symbol reel 531A and the second virtual symbol reel 531B are inactive. However, it is understood that this is an example. In other examples, inactive virtual symbol reels may be configured to only include nonvalue symbols instead of value symbols and nonvalue symbols. Various configurations are possible and contemplated without departing from the scope of the present disclosure.

A game outcome for the play 800 of the example user-configurable slot type concatenation game may be determined. As illustrated, the symbol 532 is a trigger symbol $. As the symbol 532 is a trigger symbol $ that occupies the middle row, symbol 532 indicates a payline corresponding to the middle row. The middle row includes a symbol 533C on the third virtual symbol reel 531C and a symbol 533D on the fourth virtual symbol reel 531D. The symbols 533C-533D are both value symbols. As such, the game outcome for the play 800 of the example user-configurable slot type concatenation game may be determined by concatenating the symbols 533C-533D. This game outcome yields an award of $77, less than the play 500 of FIGS. 5A and 5B and the play 700 of FIG. 7.

Although FIGS. 5A-8 are illustrated and described as selecting all of the virtual symbol reels when a Bet×5 touch area 534E is selected, selecting the second through fourth virtual symbol reels 531B-531D when either the Bet×3 touch area 534C or the Bet×4 touch area 534D are selected, and selecting the third and fourth virtual symbol reels 531C-531D when either the Bet×1 touch area 534A or the Bet×2 touch area 534B are selected, it is understood that this is an example. In other examples, other configurations of virtual symbol reels may be selected using the user interface mechanisms shown and described and/or other user interface mechanisms.

Figure 9:
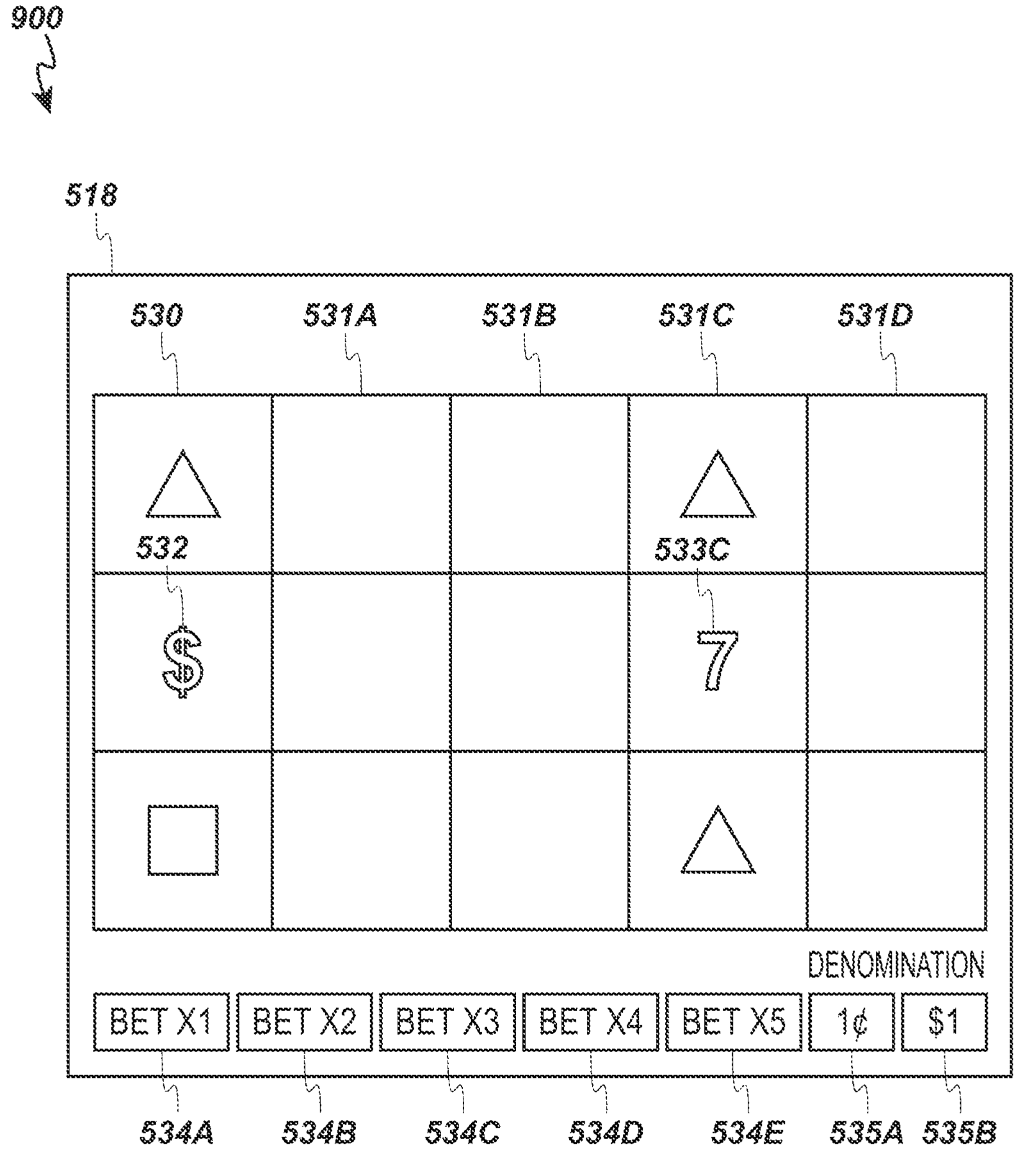
FIG. 9 depicts an alternative to the second alternative example of play of the example user-configurable slot type concatenation game of FIG. 5A illustrated in FIG. 8.

For example, FIG. 9 depicts an alternative 900 to the second alternative example of play of the example user-configurable slot type concatenation game of FIG. 5A illustrated in FIG. 8. In this alternative 900, selection of the Bet×1 touch area 534A only selects the third virtual symbol reel 531C. This causes the middle row to only include the symbol 533C, yielding an award of $7, less than the play 500 of FIG. 5A, the play 700 of FIG. 7, and the play 800 of FIG. 8.

Figure 10:
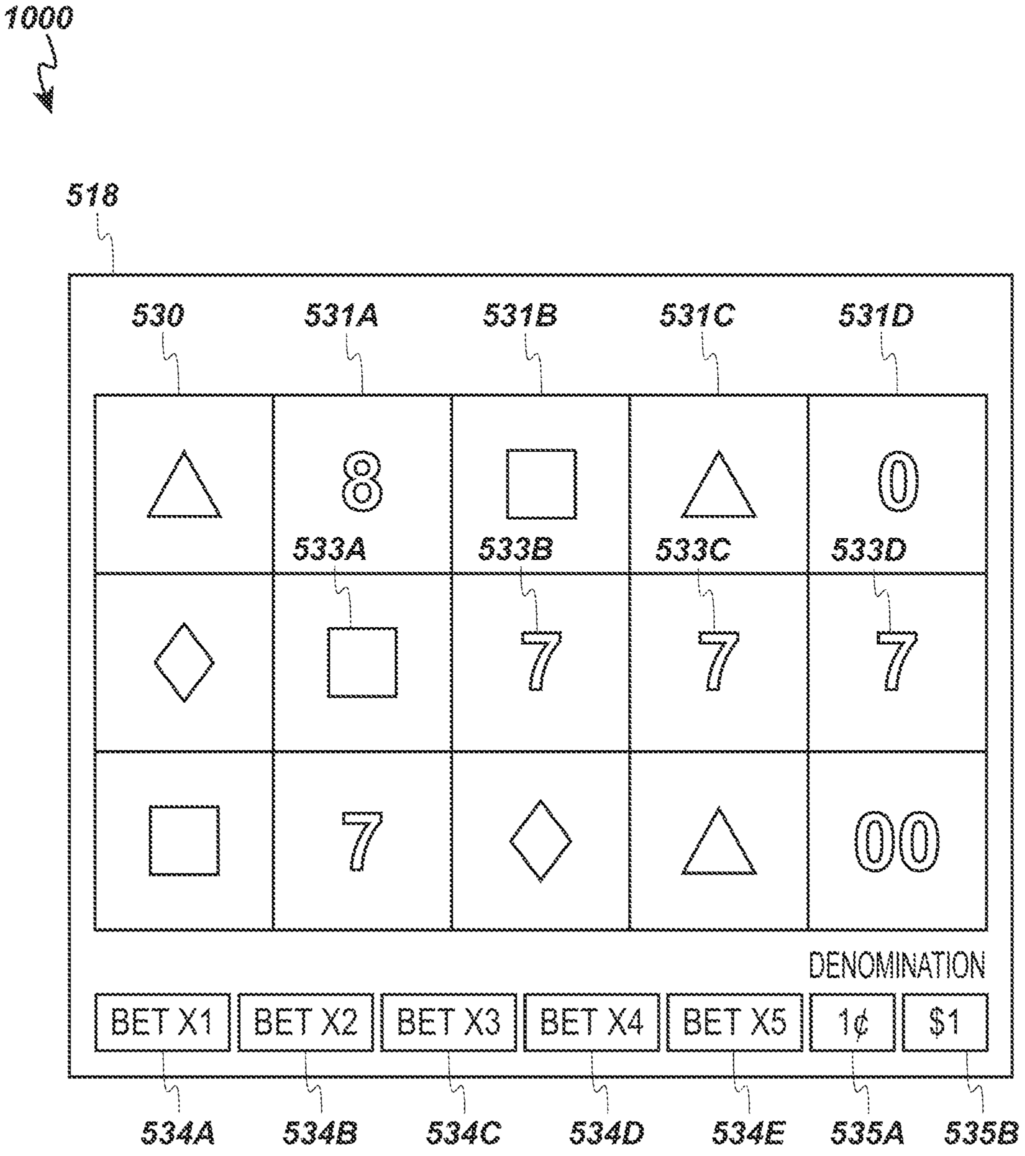
FIG. 10 depicts a third alternative example of play of the example user-configurable slot type concatenation game of FIG. 5A.

FIG. 10 depicts a third alternative example of play 1000 of the example user-configurable slot type concatenation game of FIG. 5A. In this play 1000, the middle row of the virtual trigger reel 530 includes a nonvalue symbol that is not a trigger symbol. This means that the symbols 533A-533D are ignored, along with all other symbols as the top row and bottom row of the virtual trigger reel 530 also include nonvalue symbols that are not trigger symbols. As such, determination of the game outcome yields no award in the play 1000.

Although FIGS. 5A-10 illustrate particular configurations, it is understood that these are examples. In other implementations, other implementations are possible and contemplated without departing from the scope of the present disclosure.

For example, FIGS. 5A-10 illustrate configurations where the value symbols 0 and 00 may only be configured on the fourth virtual symbol reel 531D. However, it is understood that this is an example. In other implementations, the value symbols 0 and 00 may only be configured on other virtual symbol reels. Various configurations are possible and contemplated without departing from the scope of the present disclosure.

By way of another example, FIGS. 5A-10 illustrate configurations where a sequence of progressively higher bets unlocks a particular sequence of the virtual symbol reels. However, it is understood that this is an example. In other implementations, the player may be able to select particular virtual symbol reels to activate and/or inactivate. In still other implementations, other patterns of bets may unlock other sequences of the virtual symbol reels. Various configurations are possible and contemplated without departing from the scope of the present disclosure.

In various implementations, a system may include at least one user interface mechanism that receives an indication of a number of symbol reels, the symbol reels including nonvalue symbols, and an indication of a denomination set; at least one non-transitory storage medium storing instructions; and at least one processor. The at least one processor may execute the instructions to configure the symbol reels using value symbols from a value symbol table according to the indication of the denomination set, determine an outcome of the number of the symbol reels, and determine a game outcome by concatenating a number of the value symbols present in the outcome of the number of the symbol reels along a payline indicated by a trigger symbol present on a trigger reel.

In some examples, the at least one processor may omit a number of the nonvalue symbols present in the outcome of the number of the symbol reels along the payline from the game outcome. In various examples, the at least one processor may present the outcome of the number of the symbol reels along with an outcome of at least one additional symbol reel. In a number of examples, the at least one processor may present an indication that the outcome of the at least one additional symbol reel is inactive. In some examples, the at least one processor may present the outcome of the number of the symbol reels along with at least one blank symbol reel.

In various examples, the at least one processor may modify the game outcome according to at least one of the nonvalue symbols present in the outcome of the number of the symbol reels along the payline. In some such examples, the at least one of the nonvalue symbols may correspond to a multiplier.

In various such examples, the at least one processor may generate a modified game outcome by concatenating a first of the nonvalue symbols and a second of the nonvalue symbols present in the outcome of the number of the symbol reels along the payline. In a number of such examples, the modified game outcome may correspond to a game credit. In various such examples, the modified game outcome may correspond to a progressive jackpot.

In some implementations, a system may include symbol reels operable to iterate through a sequence of possible symbol reel outcomes and stop at a final symbol reel outcome, the symbol reels including nonvalue symbols; a trigger reel operable to iterate through a sequence of possible trigger reel outcomes and stop at a final trigger reel outcome; at least one user interface mechanism that receives an indication of a number of the symbol reels and an indication of a denomination set; and at least one processor. The at least one processor may configure the symbol reels with value symbols according to the indication of the denomination set, determine an outcome of the number of the symbol reels, and determine a game outcome by concatenating a number of the value symbols present in the outcome of the number of the symbol reels along a payline indicated by a trigger symbol present on a trigger reel.

In various examples, the indication of the number of the symbol reels may select at least one particular symbol reel from the symbol reels. In some examples, the indication of the denomination set may specify at least a lower denomination set or a higher denomination set. In various such examples, the higher denomination set may correspond to a larger set of value symbols than the lower denomination set. In a number of examples, the game outcome may be a first game outcome, the outcome of the number of the symbol reels may be a first outcome of the number of the symbol reels, the number of the symbol reels may be a first number of the symbol reels, the payline may be a first payline, the trigger symbol may be a first trigger symbol, and the at least one processor may determine a second game outcome by concatenating a number of the nonvalue symbols present in a second outcome of a second number of the symbol reels along a second payline indicated by a second trigger symbol present on the trigger reel.

In a number of implementations, a system may include at least one non-transitory storage medium storing instructions and at least one processor. The at least one processor may execute the instructions to receive an indication of a number of symbol reels, the symbol reels including nonvalue symbols; receive an indication of a denomination set; when the indication of the denomination set indicates a first denomination set, configure the symbol reels with first value symbols that include a first respin value; when the indication of the denomination set indicates a second denomination set, configure the symbol reels with second value symbols that include a second respin value; determine a first outcome of the number of the symbol reels; determine a first game outcome by concatenating a first number of the first value symbols or the second value symbols present in the first outcome of the number of the symbol reels along a first payline indicated by a first trigger symbol present on a trigger reel; determine to respin at least when the first game outcome includes the first respin value or the second respin value; and upon determining to respin, determine a second outcome of the number of the symbol reels and determine a second game outcome by concatenating a second number of the first value symbols or the second value symbols present in the second outcome of the number of the symbol reels along a second payline indicated by a second trigger symbol present on the trigger reel.

In various examples, the second value symbols may include the first respin value. In some examples the second value symbols may include the first value symbols. In a number of examples, the at least one processor may determine to respin when the first game outcome includes none of the first value symbols or the second value symbols other than the first respin value or the second respin value. In various examples, the at least one processor may only configure one of the symbol reels with the first respin value or the second respin value.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A system comprising:

at least one non-transitory storage medium storing instructions; and at least one processor that executes the instructions to:

configure symbol reels using value symbols from a value symbol table according to a selected denomination set and a random number generator such that at least a first value symbol is used for a first selected denomination set and at least a second value symbol different from the first value symbol is used for a second denomination set; and display a game outcome on a display generated by concatenating a number of the value symbols present in an outcome of the symbol reels.

2. The system of claim 1, wherein the at least one processor and the display are components of a gaming device.

3. The system of claim 1, wherein the display is a component of a gaming device that communicates with the at least one processor.

4. The system of claim 1, wherein the at least one processor displays the game outcome by transmitting a message to the display.

5. The system of claim 1, wherein the at least one processor determines the game outcome.

6. The system of claim 1, wherein the at least one processor further executes the instructions to determine a payline indicated by a trigger symbol present on a trigger reel.

7. The system of claim 6, wherein the at least one processor concatenates the number of the value symbols on the payline.

8. The system of claim 1, wherein the at least one processor is operable to receive an indication of the selected denomination set.

9. The system of claim 1, wherein the at least one processor is operable to further execute the instructions to select a number of the symbol reels.

10. The system of claim 9, wherein the at least one processor is operable to receive an indication of the number of the symbol reels.

11. The system of claim 1, wherein the at least one processor further executes the instructions to omit a number of nonvalue symbols present in the outcome of the symbol reels from the game outcome.

12. The system of claim 1, wherein the at least one processor further executes the instructions to present the outcome of the symbol reels along with an outcome of at least one additional symbol reel.

13. The system of claim 12, wherein the at least one processor further executes the instructions to present an indication that the at least one additional symbol reel is inactive.

14. The system of claim 1, wherein the at least one processor further executes the instructions to present the outcome of the symbol reels along with at least one blank symbol reel.

15. A method, comprising:

configuring symbol reels using value symbols from a value symbol table according to a selected denomination set and a random number generator such that at least a first value symbol is used for a first selected denomination set and at least a second value symbol different from the first value symbol is used for a second denomination set; and displaying a game outcome on a display generated by concatenating a number of the value symbols present in an outcome of the symbol reels.

16. The method of claim 15, further comprising modifying the game outcome according to at least one nonvalue symbol present in the outcome of the symbol reels.

17. The method of claim 16, wherein the at least one of the nonvalue symbols corresponds to a multiplier.

18. A computer program product stored in a non-transitory storage medium, comprising:

first instructions, executable by at least one processor to configure symbol reels using value symbols from a value symbol table according to a selected denomination set and a random number generator such that at least a first value symbol is used for a first selected denomination set and at least a second value symbol different from the first value symbol is used for a second denomination set; and second instructions, executable by the at least one processor to cause a game outcome to be displayed on a display, wherein the game outcome is generated by concatenating a number of the value symbols present in an outcome of the symbol reels.

19. The computer program product of claim 18, wherein the value symbols include:

a first respin value when the selected denomination set is a first denomination set; and a second respin value when the selected denomination set is a second denomination set.

20. The computer program product of claim 19, wherein the value symbols also include the first respin value when the selected denomination set is the second denomination set.

* * * * *